(12) United States Patent
Schultz

(10) Patent No.: US 8,001,046 B2
(45) Date of Patent: Aug. 16, 2011

(54) SYSTEM AND METHODS FOR AUTOMATING PRODUCT RETURNS

(75) Inventor: Roger Stephen Schultz, Loganville, GA (US)

(73) Assignee: Afterbot, Inc., Norcross, GA (US)

( * ) Notice: Subject to any disclaimer, the term of this patent is extended or adjusted under 35 U.S.C. 154(b) by 11 days.

(21) Appl. No.: 12/686,741

(22) Filed: Jan. 13, 2010

(65) Prior Publication Data

US 2010/0121771 A1    May 13, 2010

Related U.S. Application Data

(63) Continuation of application No. 10/153,146, filed on May 22, 2002, now Pat. No. 7,742,989, which is a continuation-in-part of application No. 09/776,412, filed on Feb. 2, 2001, now Pat. No. 7,552,087.

(60) Provisional application No. 60/180,102, filed on Feb. 3, 2000, provisional application No. 60/236,007, filed on Sep. 27, 2000.

(51) Int. Cl.
*G06Q 40/00* (2006.01)
(52) U.S. Cl. .......................... 705/40; 705/35
(58) Field of Classification Search ............ 705/35, 705/40
See application file for complete search history.

(56) References Cited

U.S. PATENT DOCUMENTS

| | | |
|---|---|---|
| 5,351,186 A | 9/1994 | Bullock et al. |
| 5,412,191 A | 5/1995 | Baitz et al. |
| 5,434,394 A | 7/1995 | Roach et al. |
| 5,465,206 A | 11/1995 | Hilt et al. |
| 5,638,519 A | 6/1997 | Haluska |
| 5,671,282 A | 9/1997 | Wolff et al. |
| 5,677,955 A | 10/1997 | Doggett et al. |
| 5,699,528 A | 12/1997 | Hogan |
| 5,710,886 A | 1/1998 | Christensen et al. |
| 5,727,048 A | 3/1998 | Hiroshima et al. |
| 5,739,512 A | 4/1998 | Tognazzini |
| 5,745,036 A | 4/1998 | Clare |
| 5,757,917 A | 5/1998 | Rose et al. |
| 5,790,677 A | 8/1998 | Fox et al. |
| 5,821,513 A | 10/1998 | O'Hagen et al. |
| 5,870,719 A | 2/1999 | Maritzen et al. |
| 5,878,141 A | 3/1999 | Daly et al. |
| 5,884,271 A | 3/1999 | Pitroda |
| 5,890,137 A | 3/1999 | Koreeda |
| 5,890,138 A | 3/1999 | Godin et al. |
| 5,897,622 A | 4/1999 | Blinn et al. |

(Continued)

FOREIGN PATENT DOCUMENTS

JP    10-055384    2/1998

(Continued)

OTHER PUBLICATIONS

Allen, Cliff Internet World guide to one-to-one marketing. 198; John Wiley & Sons, Inc., Canada, SP002335192.

(Continued)

*Primary Examiner* — Thu Thao Havan
(74) *Attorney, Agent, or Firm* — Ballard Spahr LLP

(57) ABSTRACT

In connection with a sales transaction, product information is directly collected from the product provided with a label or tag that can be electronically scanned by, for example, optical scanning technology or radio-frequency scanning technology. The product information is electronically provided to the buyer in the form of an electronic receipt.

13 Claims, 21 Drawing Sheets

U.S. PATENT DOCUMENTS

| | | | |
|---|---|---|---|
| 5,899,981 | A | 5/1999 | Taylor et al. |
| 5,903,878 | A | 5/1999 | Talati et al. |
| 5,903,880 | A | 5/1999 | Biffar |
| 5,908,469 | A | 6/1999 | Botz et al. |
| 5,913,210 | A | 6/1999 | Call |
| 5,915,022 | A | 6/1999 | Robinson et al. |
| 5,920,847 | A | 7/1999 | Kolling et al. |
| 5,930,767 | A | 7/1999 | Reber et al. |
| 5,943,656 | A | 8/1999 | Crooks et al. |
| 5,950,173 | A | 9/1999 | Perkowski |
| 5,970,470 | A | 10/1999 | Walker et al. |
| 5,970,473 | A | 10/1999 | Gerszberg et al. |
| 5,978,774 | A | 11/1999 | Rogers et al. |
| 6,003,007 | A | 12/1999 | DiRienzo |
| 6,009,408 | A | 12/1999 | Buchanan |
| 6,012,045 | A | 1/2000 | Barzilai et al. |
| 6,018,719 | A * | 1/2000 | Rogers et al. ............... 705/24 |
| 6,029,141 | A | 1/2000 | Bezos et al. |
| 6,055,513 | A | 4/2000 | Katz et al. |
| 6,067,529 | A | 5/2000 | Ray et al. |
| 6,125,352 | A | 9/2000 | Franklin et al. |
| 6,327,576 | B1 | 12/2001 | Ogasawara |
| 6,341,353 | B1 * | 1/2002 | Herman et al. ............... 726/5 |
| 6,394,341 | B1 | 5/2002 | Mäkipää et al. |
| 6,463,421 | B2 | 10/2002 | Junger |
| 6,543,683 | B2 | 4/2003 | Hoffman |
| 6,947,941 | B1 | 9/2005 | Koon |
| 7,552,087 | B2 | 6/2009 | Schultz et al. |
| 7,742,989 | B2 | 6/2010 | Schultz |
| 2002/0059139 | A1 * | 5/2002 | Evans ........................ 705/40 |
| 2002/0133425 | A1 | 9/2002 | Pederson et al. |
| 2009/0292591 | A1 | 11/2009 | Schultz et al. |
| 2010/0121708 | A1 | 5/2010 | Schultz et al. |
| 2010/0121732 | A1 | 5/2010 | Schultz et al. |

FOREIGN PATENT DOCUMENTS

| | | |
|---|---|---|
| JP | 10-254947 | 9/1998 |
| JP | 10-281788 | 10/1998 |
| WO | WO95/02227 | 1/1995 |
| WO | WO 99/28861 | 2/1999 |
| WO | WO 99/16029 | 4/1999 |
| WO | WO 99/22327 | 5/1999 |
| WO | WO 99/07121 | 6/1999 |
| WO | WO 99/46706 | 9/1999 |
| WO | WO 00/75834 | 12/2000 |
| WO | WO01/57736 | 2/2001 |

OTHER PUBLICATIONS

Website: http://web.archive.org/web/19991128084; XP-002377242; Nov. 28, 1999; p. 1.
Website: http://web.archive.org/web/19991127140; XP-002377243; FAQ's; Nov. 27, 1999; pp. 1-2.
Notification of Transmittal of International Preliminary Examination Report issued Dec. 19, 2001 re International Patent Application PCT/US01/03573.
Notification of Transmittal of International Search Report issued Apr. 27, 2001 re International Patent Application PCT/US01/03573.
Supplementary European Search Report issued May 15, 2006 re European Patent Application No. EP 01906957.
Issue Notification issued Jun. 23, 2009 re. U.S. Appl. No. 09/776,412, filed Feb. 2, 2001.
Notice of Allowance issued Apr. 30, 2009 re U.S. Appl. No. 09/776,412, filed Feb. 2, 2001.
Non-Final Office Action issued Jan. 22, 2009 re U.S. Appl. No. 09/776,412, filed Feb. 2, 2001.
Response Accompanying a Request for Continued Examination filed Dec. 12, 2008 re U.S. Appl. No. 09/776,412, filed Feb. 2, 2001.
Final rejection issued Jun. 13, 2008 re U.S. Appl. No. 09/776,412, filed Feb. 2, 2001.
Response to Office Action filed Mar. 7, 2008 re U.S. Appl. No. 09/776,412, filed Feb. 2, 2001.
Non-Final Office Action issued Sep. 7, 2007 re U.S. Appl. No. 09/776,412, filed Feb. 2, 2001.
Response Accompanying a Request for Continued Examination filed Jun. 20, 2007 re U.S. Appl. No. 09/776,412, filed Feb. 2, 2001.
Final rejection issued May 18, 2006 re U.S. Appl. No. 09/776,412, filed Feb. 2, 2001.
Response to Office Action filed Feb. 27, 2006 re U.S. Appl. No. 09/776,412, filed Feb. 2, 2001.
Non-Final Office Action issued Aug. 25, 2005 re U.S. Appl. No. 09/776,412, filed Feb. 2, 2001.
Preliminary Amendment filed Mar. 14, 2001 re U.S. Appl. No. 09/776,412, filed Feb. 2, 2001.
Notice of Abandonment issued Mar. 30, 2009 re U.S. Appl. No. 09/776,420 filed Feb. 2, 2001.
Non-final rejection issued Sep. 19, 2008 re U.S. Appl. No. 09/776,420, filed Feb. 2, 2001.
Response to Restriction Requirement filed Jun. 19, 2008 re U.S. Appl. No. 09/776,420, filed Feb. 2, 2001.
Restriction/Election Requirement issued Feb. 25, 2008 re U.S. Appl. No. 09/776,420, filed Feb. 2, 2001.
Response to Office Communication filed Dec. 6, 2007 re U.S. Appl. No. 09/776,420, filed Feb. 2, 2001.
Office Communication issued Oct. 9, 2007 re U.S. Appl. No. 09/776,420, filed Feb. 2, 2001.
Response After Non-Final Action filed Jul. 18, 2007 re U.S. Appl. No. 09/776,420, filed Feb. 2, 2001.
Non-final Rejection issued Jan. 18, 2007 re U.S. Appl. No. 09/776,420, filed Feb. 2, 2001.
Response after Non-Final Action filed Jul. 7, 2006 re U.S. Appl. No. 09/776,420, filed Feb. 2, 2001.
Non-Final Rejection issued Jan. 6, 2006 re U.S. Appl. No. 09/776,420, filed Feb. 2, 2001.
Response Accompanying a Request for Continued Examination filed Sep. 22, 2005 re U.S. Appl. No. 09/776,420, filed Feb. 2, 2001.
Final Rejection issued Jun. 2, 2005 re U.S. Appl. No. 09/776,420, filed Feb. 2, 2001.
Response After Non-Final Action filed Mar. 18, 2005 re U.S. Appl. No. 09/776,420, filed Feb. 2, 2001.
Non-Final Rejection issued Sep. 20, 2004 re U.S. Appl. No. 09/776,420, filed Feb. 2, 2001.
Amendment Accompanying Request for Continued Examination filed Jan. 26, 2004 re U.S. Appl. No. 09/776,420, filed Feb. 2, 2001.
Final Rejection issued Jul. 24, 2003 re U.S. Appl. No. 09/776,420, filed Feb. 2, 2001.
Response after Non-Final Action filed Apr. 23, 2003 re U.S. Patent Appl. No. 09/776,420, filed Feb. 2, 2001.
Non-Final Rejection issued Dec. 3, 2002 re U.S. Appl. No. 09/776,420, filed Feb. 2, 2001.
Response After Non-Final Action filed Sep. 6, 2002 re U.S. Appl. No. 09/776,420, filed Feb. 2, 2001.
Non-Final Rejection issued Jul. 1, 2002 re U.S. Appl. No. 09/776,420, filed Feb. 2, 2001.
Preliminary Amendment filed Mar. 16, 2001 re U.S. Appl. No. 09/776,420, filed Feb. 2, 2001.
Notice of Abandonment issued Dec. 17, 2003 re U.S. Appl. No. 09/776,567, filed Feb. 2, 2001.
Non-Final Rejection issued May 29, 2003 re U.S. Appl. No. 09/776,567, filed Feb. 2, 2001.
Amendment Accompanying Request for Continued Examination filed Mar. 21, 2003, filed Feb. 2, 2001 re U.S. Appl. No. 09/776,567.
Final Rejection issued Oct. 21, 2002 re U.S. Appl. No. 09/776,567, filed Feb. 2, 2001.
Response after Non-Final Action filed Aug. 19, 2002 re U.S. Appl. No. 09/776,567, filed Feb. 2, 2001.
Non-Final Rejection issued May 23, 2002 re U.S. Appl. No. 09/776,567, filed Feb. 2, 2001.
Preliminary Amendment filed Mar. 14, 2001 re U.S. Appl. No. 09/776,567, filed Feb. 2, 2001.
Notice of Abandonment issued Mar. 24, 2009 re U.S. Appl. No. 10/153,160, filed May 22, 2002.
Notice of Appeal filed Jul. 29, 2008 re U.S. Appl. No. 10/153,160, filed May 22, 2002.
Final Rejection issued Jan. 31, 2008 re U.S. Appl. No. 10/153,160, filed May 22, 2002.
Response After Non-Final Office Action filed Oct. 25, 2007 re U.S. Appl. No. 10/153,160, filed May 22, 2002.

Non-final rejection issued Apr. 25, 2007 re U.S. Appl. No. 10/153,160, filed May 22, 2002.
Notice of Abandonment issued Dec. 20, 2007 re U.S. Appl. No. 10/153,157, filed May 22, 2002.
Non-Final Rejection issued Apr. 20, 2007 re U.S. Appl. No. 10/153,157, filed May 22, 2002.
Issue Notification issued Jun. 2, 2010 re U.S. Appl. No. 10/153,146, filed May 22, 2002.
Notice of Allowance issued Mar. 5, 2010 re U.S. Appl. No. 10/153,146, filed May 22, 2002.
Response to Final Office Action Accompanying Request for Continued Examination filed Nov. 24, 2009 re U.S. Appl. No. 10/153,146, filed May 22, 2002.
Final rejection issued 11/26/08 re. U.S. Appl. No. 10/153,146, filed May 22, 2002.
Response to Non-Final Office Action filed Aug. 21, 2008 re. U.S. Appl. No. 10/153,146, filed May 22, 2002.
Non-final rejection issued Apr. 16, 2008 re U.S. Appl. No. 10/153,146, filed May 22, 2002.
Response after Non-Final Action filed Jan. 7, 2008 re U.S. Appl. No. 10/153,146, filed May 22, 2002.
Non-final rejection issued Jul. 5, 2007 re U.S. Appl. No. 10/153,146, filed May 22, 2002.
Non-Final Office Action issued Nov. 9, 2010 re U.S. Appl. No. 12/473,943, filed May 28, 2009.
Non-Final Office Action issued Nov. 24, 2010 re U.S. Appl. No. 12/686,786, filed Jan. 13, 2010.
Preliminary Amendment filed Jan. 13, 2010 re U.S. Appl. No. 12/686,786, filed Jan. 13, 2010.
Preliminary Amendment filed Jan. 13, 2010 re U.S. Appl. No. 12/686,763, filed Jan. 13, 2010.
Supplementary European Search Report issued May 15, 2006 re European Patent Application No. EP 01906957.
Issue Notification issued Jun. 23, 2009 re. U.S. Appl. No. 09/776,412, filed Feb. 2, 2001.
Notice of Allowance issued Apr. 30, 2009 re U.S. Appl. No. 09/776,412, filed Feb. 2, 2001.
Non-Final Office Action issued Jan. 22, 2009 re U.S. Appl. No. 09/776,412, filed Feb. 2, 2001.
Response Accompanying a Request for Continued Examination filed Dec. 12, 2008 re U.S. Appl. No. 09/776,412, filed Feb. 2, 2001.
Final rejection issued Jun. 13, 2008 re U.S. Appl. No. 09/776,412, filed Feb. 2, 2001.
Response to Office Action filed Mar. 7, 2008 re U.S. Appl. No. 09/776,412, filed Feb. 2, 2001.
Non-Final Office Action issued Sep. 7, 2007 re U.S. Appl. No. 09/776,412, filed Feb. 2, 2001.
Response Accompanying a Request for Continued Examination filed Jun. 20, 2007 re U.S. Appl. No. 09/776,412, filed Feb. 2, 2001.
Final rejection issued May 18, 2006 re U.S. Appl. No. 09/776,412, filed Feb. 2, 2001.
Response to Office Action filed Feb. 27, 2006 re U.S. Appl. No. 09/776,412, filed Feb. 2, 2001.
Non-Final Office Action issued Aug. 25, 2005 re U.S. Appl. No. 09/776,412, filed Feb. 2, 2001.
Preliminary Amendment filed Mar. 14, 2001 re U.S. Appl. No. 09/776,412, filed Feb. 2, 2001.
Notice of Abandonment issued Mar. 30, 2009 re U.S. Appl. No. 09/776,420 filed Feb. 2, 2001.
Non-final rejection issued Sep. 19, 2008 re U.S. Appl. No. 09/776,420, filed Feb. 2, 2001.
Response to Restriction Requirement filed Jun. 19, 2008 re U.S. Appl. No. 09/776,420, filed Feb. 2, 2001.
Restriction/Election Requirement issued Feb. 25, 2008 re U.S. Appl. No. 09/776,420, filed Feb. 2, 2001.
Response to Office Communication filed Dec. 6, 2007 re U.S. Appl. No. 09/776,420, filed Feb. 2, 2001.
Office Communication issued Oct. 9, 2007 re U.S. Appl. No. 09/776,420, filed Feb. 2, 2001.
Response After Non-Final Action filed Jul. 18, 2007 re U.S. Appl. No. 09/776,420, filed Feb. 2, 2001.
Non-final Rejection issued Jan. 18, 2007 re U.S. Appl. No. 09/776,420, filed Feb. 2, 2001.
Response after Non-Final Action filed Jul. 7, 2006 re U.S. Appl. No. 09/776,420, filed Feb. 2, 2001.
Non-Final Rejection issued Jan. 6, 2006 re U.S. Appl. No. 09/776,420, filed Feb. 2, 2001.
Response Accompanying a Request for Continued Examination filed Sep. 22, 2005 re U.S. Appl. No. 09/776,420, filed Feb. 2, 2001.
Final Rejection issued Jun. 2, 2005 re U.S. Appl. No. 09/776,420, filed Feb. 2, 2001.
Response After Non-Final Action filed Mar. 18, 2005 re U.S. Appl. No. 09/776,420, filed Feb. 2, 2001.
Non-Final Rejection issued Sep. 20, 2004 re U.S. Appl. No. 09/776,420, filed Feb. 2, 2001.
Amendment Accompanying Request for Continued Examination filed Jan. 26, 2004 re U.S. Appl. No. 09/776,420, filed Feb. 2, 2001.
Final Rejection issued Jul. 24, 2003 re U.S. Appl. No. 09/776,420, filed Feb. 2, 2001.
Response after Non-Final Action filed Apr. 23, 2003 re U.S. Appl. No. 09/776,420, filed Feb. 2, 2001.
Non-Final Rejection issued Dec. 3, 2002 re U.S. Appl. No. 09/776,420, filed Feb. 2, 2001.
Response After Non-Final Action filed Sep. 6, 2002 re U.S. Appl. No. 09/776,420, filed Feb. 2, 2001.
Non-Final Rejection issued Jul. 1, 2002 re U.S. Appl. No. 09/776,420, filed Feb. 2, 2001.
Preliminary Amendment filed Mar. 16, 2001 re U.S. Appl. No. 09/776,420, filed Feb. 2, 2001.
Notice of Abandonment issued Dec. 17, 2003 re U.S. Appl. No. 09/776,567, filed Feb. 2, 2001.
Non-Final Rejection issued May 29, 2003 re U.S. Appl. No. 09/776,567, filed Feb. 2, 2001.
Amendment Accompanying Request for Continued Examination filed Mar. 21, 2003, filed Feb. 2, 2001 re U.S. Appl. No. 09/776,567.
Final Rejection issued Oct. 21, 2002 re U.S. Appl. No. 09/776,567, filed Feb. 2, 2001.
Response after Non-Final Action filed Aug. 19, 2002 re U.S. Appl. No. 09/776,567, filed Feb. 2, 2001.
Non-Final Rejection issued May 23, 2002 re U.S. Appl. No. 09/776,567, filed Feb. 2, 2001.
Preliminary Amendment filed Mar. 14, 2001 re U.S. Appl. No. 09/776,567, filed Feb. 2, 2001.
Notice of Abandonment issued Mar. 24, 2009 re U.S. Appl. No. 10/153,160, filed May 22, 2002.
Notice of Appeal filed Jul. 29, 2008 re U.S. Appl. No. 10/153,160, filed May 22, 2002.
Final Rejection issued Jan. 31, 2008 re U.S. Appl. No. 10/153,160, filed May 22, 2002.
Response After Non-Final Office Action filed Oct. 25, 2007 re U.S. Appl. No. 10/153,160, filed May 22, 2002.
Non-final rejection issued Apr. 25, 2007 re U.S. Appl. No. 10/153,160, filed May 22, 2002.
Notice of Abandonment issued Dec. 20, 2007 re U.S. Appl. No. 10/153,157, filed May 22, 2002.
Non-Final Rejection issued Apr. 20, 2007 re U.S. Appl. No. 10/153,157, filed May 22, 2002.
Issue Notification issued Jun. 2, 2010 re U.S. Appl. No. 10/153,146, filed May 22, 2002.
Notice of Allowance issued Mar. 5, 2010 re U.S. Appl. No. 10/153,146, filed May 22, 2002.
Response to Final Office Action Accompanying Request for Continued Examination filed Nov. 24, 2009 re U.S. Appl. No. 10/153,146, filed May 22, 2002.
Final rejection issued Nov. 26, 2008 re. U.S. Appl. No. 10/153,146, filed May 22, 2002.
Response to Non-Final Office Action filed Aug. 21, 2008 re. U.S. Appl. No. 10/153,146, filed May 22, 2002.
Non-final rejection issued Apr. 16, 2008 re U.S. Appl. No. 10/153,146, filed May 22, 2002.
Response after Non-Final Action filed Jan. 7, 2008 re U.S. Appl. No. 10/153,146, filed May 22, 2002.
Non-final rejection issued Jul. 5, 2007 re U.S. Appl. No. 10/153,146, filed May 22, 2002.
Response to Non-Final Office Action filed May 5, 2011 re U.S. Appl. No. 12/473,943, filed May 28, 2009.

Non-Final Office Action issued Nov. 9, 2010 re U.S. Appl. No. 12/473,943, filed May 28, 2009.

Non-Final Office Action issued Nov. 24, 2010 re U.S. Appl. No. 12/686,786, filed Jan. 13, 2010.

Preliminary Amendment filed Jan. 13, 2010 re U.S. Appl. No. 12/686,786, filed Jan. 13, 2010.

Non-Final Office Action issued Apr. 2, 2011 re U.S. Appl. No. 12/686,763, filed Jan. 13, 2010.

Preliminary Amendment filed Jan. 13, 2010 re U.S. Appl. No. 12/686,763, filed Jan. 13, 2010.

* cited by examiner

WELCOME JULIA GARCIA    THURSDAY, SEPTEMBER 28

LOGOUT ○

RECEIPTS ○ =UNAVAILABLE FROM MERCHANT  =STILL AT MERCHANT  =ON IT'S WAY TO YOU  =RECEIVED    FIND A RECEIPT: [  ] GO    ADD A RECEIPT

| SHIPPING INFO | PURCHASE DATE | MERCHANT | TOTAL PRICE | RECEIPT TYPE |
|---|---|---|---|---|
|  | 8-11-2000 | NORDY'S | $258.52 | AUTO |
|  | 8-12-2000 | WALLY MART | $35.52 | AUTO |
|  | 8-15-2000 | GADGET CONNECTION | $185.00 | MANUAL |
|  | 8-16-2000 | GROCERIESRUS.COM | $210.00 | AUTO |
|  | 8-25-2000 | CLASSIC KITCHEN | $485.35 | AUTO |
|  | 8-26-2000 | GAS STATION | $15.25 | MANUAL |
|  | 8-28-2000 | MARCY'S | $82.42 | AUTO |
|  | 8-29-2000 | HOME IMPROVEMENTS | $225.00 | AUTO |
|  | 8-30-2000 | TOYDOM.COM | $35.85 | AUTO |
|  | 8-30-2000 | TOOLMAKERS ANONYMOUS | $75.25 | AUTO |

< PREVIOUS 10    ≤ 2000 JAN FEB MARCH APRIL MAY JUNE JULY AUG SEPT OCT NOV DEC 2001 ≥    NEXT 10 >

| SELECT EVENT | | SELECT SUB-EVENT | |
|---|---|---|---|
| PERSONAL ⇔ | | GIFT ⇔ | |
| | ADD EDIT | | ADD EDIT |
| SELECT RECIPIENT | | SELECT SUB-RECIPIENT | |
| ALL ⇔ | | ALL ⇔ | |
| | ADD EDIT | | ADD EDIT |

— 198

| TAX RELATED: | YES ○ NO ○ | MEMO: | |
|---|---|---|---|
| HOME INVENTORY: | YES ○ NO ○ | AMOUNT: | |

WARRANTY AND REPAIR
USERS MANUAL  — 204

NOTES:

— 202

ACCESSORIES:

| QTY | ITEM # | DESCRIPTION | PRICE | DETAILS |
|---|---|---|---|---|
| 1 | 11245 | RAINBOW CLASSIC SHAVED ICE ATTACHMENT | $15.20 | ORDER |
| 1 | 16875 | EXTRA ICE CREAM CONTAINER | $25.75 | ORDER |
| 1 | 98568 | ICE CREAM RECIPE BOOK (DELUXE EDITION) | $15.00 | ORDER |
| 1 | 25458 | 14 PIECE GLASS BOWL SET | $32.50 | ORDER |

ITEMS PURCHASED FOR SUSAN UP TO SEPTEMBER 28, 2000

| DATE | QTY | RECEIPT # | ITEM | PRICE | VENDOR | CATEGORY | EVENT | RECIPIENT | TAX | BUS. INV. |
|---|---|---|---|---|---|---|---|---|---|---|
| 9-20-00 | 1 | 54585125 | HANDMADE BLANKET | $200.00 | BETTY'S BEST | GIFT | SPECIAL | SUSAN | NO | NO |
| 8-15-00 | 1 | 78596365 | CRYSTAL VASE | $75.50 | NORDY'S | GIFT | BIRTHDAY | SUSAN | NO | NO |
| 8-3-00 | 1 | 23585625 | YELLOW JACKET | $15.50 | NORDY'S | GIFT | SPECIAL | SUSAN | NO | NO |
| 5-9-00 | 1 | 65987523 | KITCHEN APPLIANCE | $150.00 | BELLA CUCINA | GIFT | HOUSE | SUSAN | NO | NO |
| 4-12-00 | 1 | 25252665 | MOVIE COUPONS | $35.00 | MOVIE.COM | GIFT | SPECIAL | SUSAN | NO | NO |
| 1-18-00 | 1 | 36523652 | BREAD BASKET | $15.00 | COUNTRY'S | GIFT | HOUSE | SUSAN | NO | NO |
| 12-25-99 | 1 | 96857422 | FULL DAY MASSAGE | $200.17 | SUVEL | GIFT | ANNIVERSARY | SUSAN | NO | NO |
| 7-30-99 | 1 | 32147585 | FRAGRANCE | $75.17 | AMORE | GIFT | SPECIAL | SUSAN | NO | NO |
| 7-30-99 | 1 | 32858568 | SHIRT | $25.00 | RACHELS | GIFT | CONGRATS | SUSAN | NO | NO |
| | | | TOTAL: | $791.34 | | | | | | |

REPORT STYLE:

DONE        EXPORT TO EXCEL

FIG. 14

SYSTEM AND METHODS FOR AUTOMATING PRODUCT RETURNS

CROSS-REFERENCE TO RELATED APPLICATIONS

This application is a continuation of U.S. patent application Ser. No. 10/153,146, filed May 22, 2002 now U.S. Pat. No. 7,742,989, which is a continuation-in-part of U.S. patent application Ser. No. 09/776,412, filed Feb. 2, 2001 now U.S. Pat. No. 7,552,087, entitled "Electronic Transaction Receipt System and Method," and the benefit of the filing dates of that application and U.S. Provisional Patent Application Ser. No. 60/180,102, filed Feb. 3, 2000, entitled "Network-Based Purchase Receipt Confirmation and Organization Application with Functional Facilitating Ancillary Merchant and Service Links," U.S. Provisional Patent Application Ser. No. 60/236,007, filed Sep. 27, 2000, entitled "System and Method for Compiling, Storing and Retrieving Digital Receipts," U.S. Non-Provisional patent application Ser. No. 09/776,420, filed Feb. 2, 2001, entitled "Electronic Transaction Receipt System and Method," and U.S. Non-Provisional patent application Ser. No. 09/776,567, filed Feb. 2, 2001, entitled "Electronic Transaction Receipt System and Method," is hereby claimed, and the specifications thereof are incorporated herein in their entireties by this reference.

BACKGROUND OF THE INVENTION

1. Field of the Invention

The present invention relates generally to electronically performed sales and other transactions in which a receipt is issued and, more specifically, to the issuance of electronic transaction receipts to buyers and product information to third parties.

2. Description of the Related Art

Receipts are issued to participants in transactions to provide evidence that the transaction has been completed. Merchants, banks and others have long issued paper printed receipts to customers. The advent of electronic transactions has led to the issuance of receipts in electronic or computer-readable format. For example, in electronic commerce ("e-commerce") transactions conducted via the global super-network referred to as the Internet, receipts are typically issued in the form of an electronic mail ("e-mail") message to the buyer. Such electronic receipts can be stored, organized, transmitted, searched, and generally managed with considerable convenience over physical printed receipts.

It would be desirable to conveniently provide electronic receipts to consumers, and to manufacturers or their representatives. The present invention addresses these problems and deficiencies and others in the manner described below.

SUMMARY OF THE INVENTION

The present invention relates to methods and systems for recording, storing, and transmitting information regarding a product exchanged between a buyer and seller in a sales transaction. Product information is directly collected electronically from the product having a label or tag that can be scanned. A receipt is electronically provided to the buyer.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 11 illustrates a screen display representing a buyer's collected receipts;

FIG. 13 illustrates a screen display representing the use of receipt categories;

FIG. 14 illustrates a screen display representing a buyer's receipts for a selected category;

DETAILED DESCRIPTION

Figure 1:
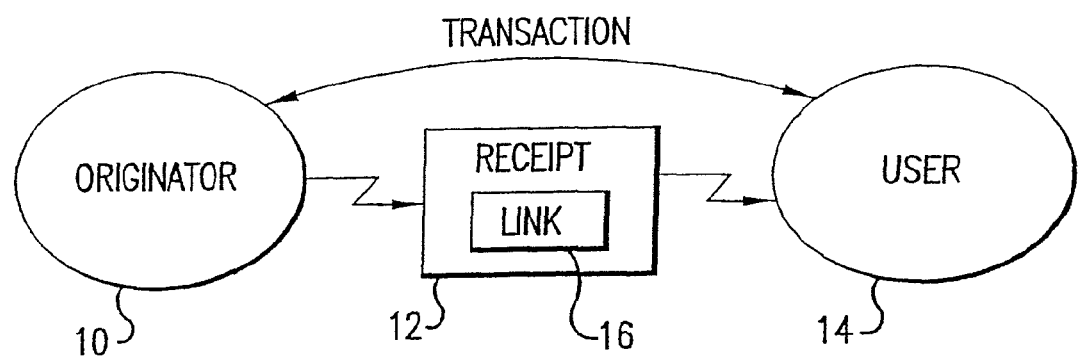
FIG. 1 illustrates the issuance of an electronic receipt having a hyperlink as a step of a transaction.

As illustrated in FIG. 1, in a transaction of any suitable type an originator 10 issues an electronic receipt 12 to a user. The transaction can be any type of transaction in which it is known to issue receipts. Originator 10 can be, for example, among other types of entities, a seller of goods or services. Accordingly, user 14 can be, for example, a buyer of the goods or services. Receipt 12 has a link 16 that associates it with additional functionality. It is such an embodiment of the invention that is described in further detail below.

Figure 3:
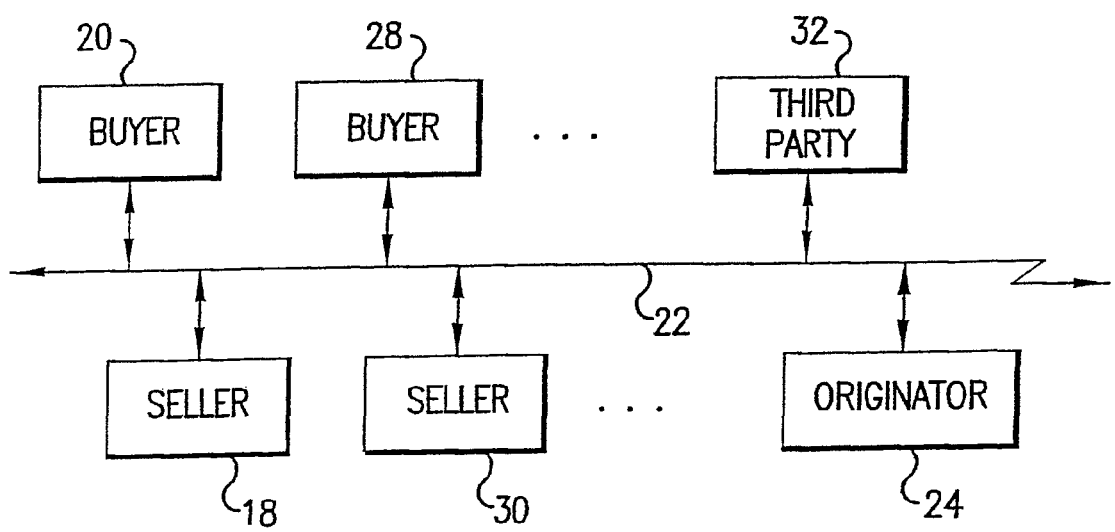
FIG. 3 illustrates a system in which buyers and sellers, third parties and non-seller originators of receipts communicate information via a hypermedia network.
Figure 2:
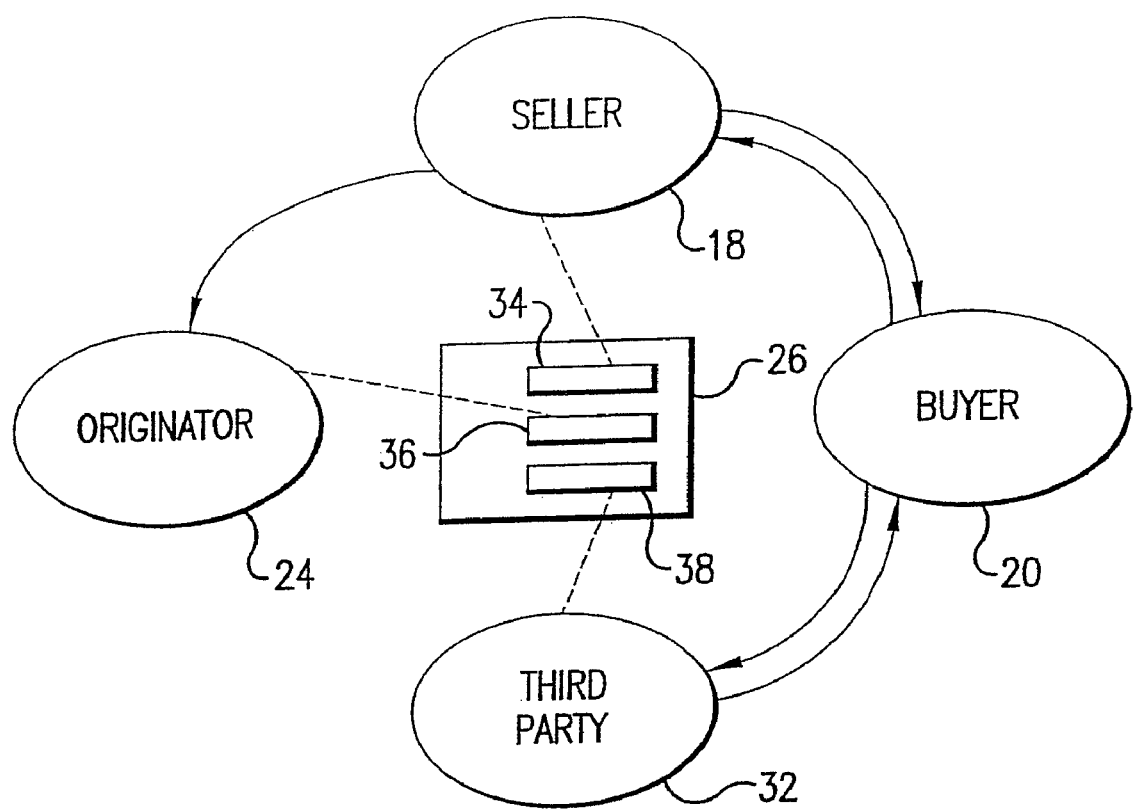
FIG. 2 illustrates an embodiment of the invention in which, in connection with a sales transaction, an originator issues a receipt having links to one or more of the seller, the originator and a third party.

As illustrated in FIGS. 2 and 3, the transaction can be a sales transaction conducted between a seller 18 and a remotely located buyer 20 via a hypermedia computer network 22 such as that which is presently known as the World Wide Web or simply "Web." The Web is part of the global super-network presently referred to as the Internet. Nevertheless, network 22 can be any sub-network of the Internet or any other suitable wide-area network through which potential buyers and potential sellers can conduct transactions. Although other network environments may be suitable, the hypermedia environment of the Web provides a number of advantages that will become apparent from the descriptions below. In accordance with the hypermedia environment of the illustrated embodiment of the invention, link 16 of FIG. 1 can be a hyperlink. As well known in the art, the Web is a client-server environment in which computers denominated as clients can communicate with other computers denominated as servers. Servers transmit to client's documents known as Web pages. Hyperlinks may be embedded in a Web page document to link it to another document or to invoke an applet or other executable code that performs some functional processing, i.e., more than merely retrieving another predetermined Web page. The term "document" includes files and other items of any suitable medium, including graphical imagery, still and moving images, and sound.

As described below in further detail, in response to a sales transaction between seller 18 and buyer 20, an originator 24 issues or transmits a sales transaction receipt 26 to buyer 20 via network 22 on behalf of seller 18. Although in the illustrated embodiment of the invention, originator 24 and seller 18 are separate entities, in other embodiments they can be the same entity or otherwise integrated with one another. In other words, in such alternative embodiments the same entity that sells the goods or services also issues receipt 26. Also, note that although FIG. 2 illustrates only the relationships between a single seller 18, a single buyer 20 and a single originator 24 for purposes of clarity, there may be many more of such entities, i.e., plural entities, as indicated in FIG. 3 by the additional buyer 28 and additional seller 30 and the ellipses (" . . . "). Either of buyers 20 and 28 can conduct a sales transaction with either of sellers 18 and 30, and the exemplary descriptions below apply equally to all such transactions.

Figure 15:
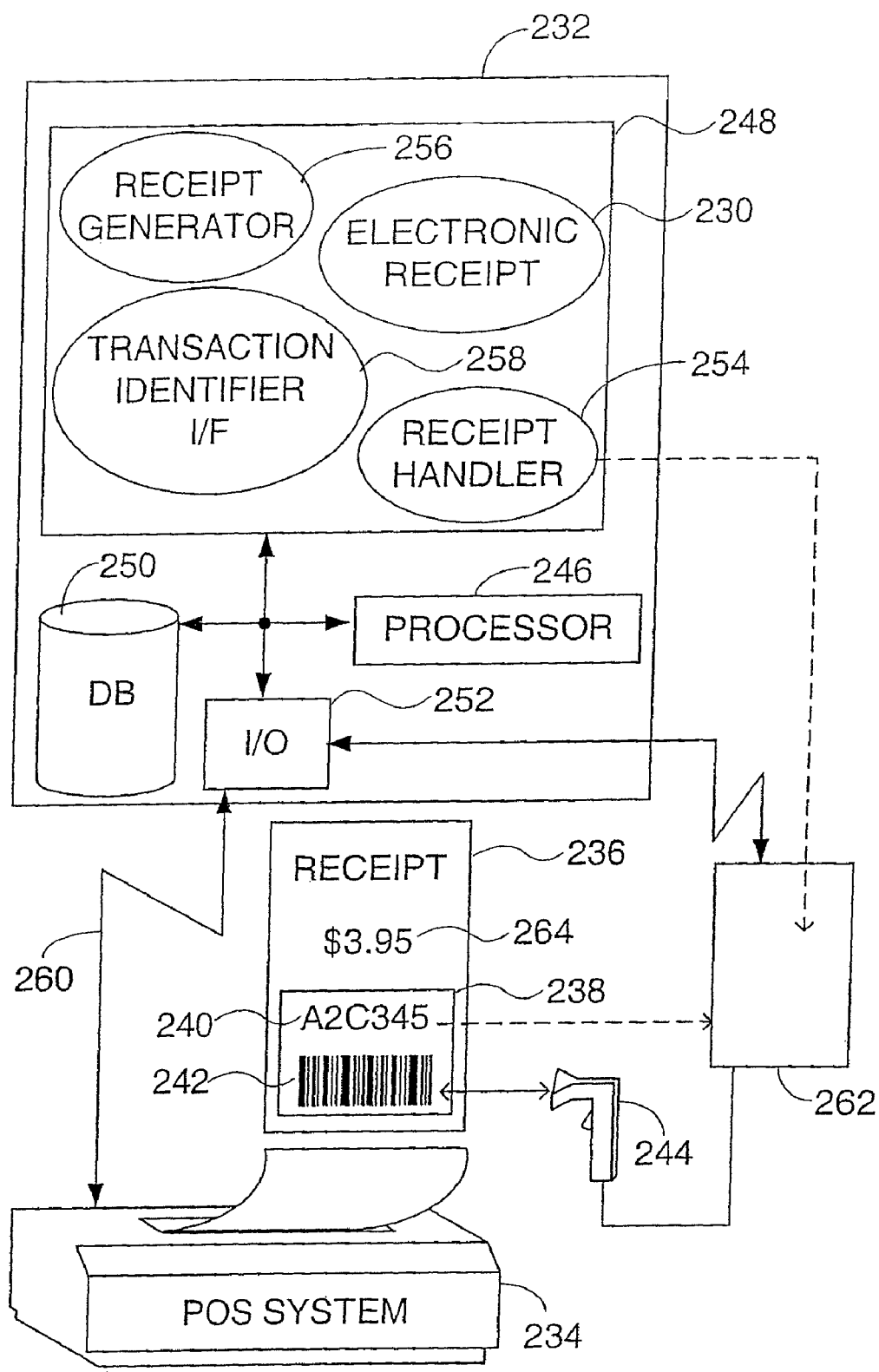
FIG. 15 is a flow diagram illustrating a method for providing an electronic receipt to a buyer.

Although in the illustrated embodiment of the invention the sales transaction is conducted electronically via a computer network such as the Web, in other embodiments the sales transaction itself can be conducted in any other suitable manner. For example, as illustrated in FIG. 15 and described in further detail below, the transaction can be conducted in a retail store that the buyer physically enters, shops in, and makes a purchase at the seller's point-of-sale (POS) terminal or register. In such an embodiment the seller's POS terminal communicates with an originator or, alternatively, with the seller's own means for generating electronic receipts. In response to an indication of completion of the transaction, the originator or the seller generates and can either transmit the receipt to the buyer (e.g., via the hypermedia network) or can store it on behalf of the buyer. As explained in further detail below, transmitting the receipt to the buyer refers to transmitting it to a computing device designated by the buyer or associated with the buyer.

There are embodiments of the invention in which a third party 32 can also be involved. As described below in further detail, third party 32 may, in some such embodiments, be an entity that sells goods or services that are commercially related to those that are the subject of the primary transaction between seller 18 and buyer 20. An example of a commercially related product is one that is used as an accessory to the product sold in the primary transaction. A straightforward example of an "accessory," as that term is used in the consumer products field, is a battery charger for a battery-operated radio. Likewise, a drill bit is commonly considered an accessory for a drill. Another example of a commercially related product is one that is used as in the same field as the product sold in the primary transaction. For example, it is well recognized that a drill and a saw are both used in the field of woodworking.

Alternatively or in addition, in some embodiments of the invention third party 32 can be an entity that accepts returns on behalf of seller 18. It is common for buyers to return products to electronic retailers, and companies exist that perform this service for retailers. Alternatively or in addition to the above, third party 32 can be an entity that provides product warranty service on behalf of seller 18.

As further described below, receipt 26 is an electronically created document instantiated by encoding the information included therein into a standardized format such as that known as Extensible Markup Language (XML). Tools for performing such coding are well known in the art to which the invention relates and include commercially available software such as JDOM and XERCES, which are publicly distributed on the Internet in both binary and source form. As well understood by persons skilled in the art to which the invention relates, such tools encode the information from a JAVA class, application, servlet or applet. Receipt 26 can be encrypted to provide security using any suitable means, such as the RSA toolkit produced by RSA Security of Bedford, Mass. and the VERISIGN toolkit produced by Verisign In. of Mountain View, Calif. Once created, receipt 26 can be wrapped in a SOAP envelope. As well known in the art, SOAP, which refers to the Simple Object Access Protocol, is a standards-based way of adding an XML envelope to an XML documents so that the recipient(s) can know what the contents of the XML document are supposed to contain and what, if any, processing is expected or required to be performed. The encrypted, wrapped receipt 26 can then be transmitted by any suitable delivery mechanism. Examples of well-known mechanisms that persons of skill in the art will recognize as suitable for this purpose include electronic mail (e-mail), file transfer protocol (FTP), a messaging middleware such as JAVA Messaging Service (JMS), or a proprietary commercially available product such as MQSERIES from IBM Corporation.

As further described below, in the illustrated embodiment of the invention receipt 26 includes hyperlinks 34, 36 and 38. As well known in the art, a hyperlink is a reference or link from some point in one hypermedia document to another document or point in a document. Hyperlink 34 is a link to (something stored on the server operated by) seller 18; hyperlink 36 is a link to (something stored on the server operated by) originator 24; and hyperlink 38 is a link to (something stored on the server operated by) third party 32. Although in the illustrated embodiment of the invention three hyperlinks 34, 36 and 38 are included in receipt 26 for purposes of illustration and clarity, any number of such links can be included, and they can link to any other suitable entity. Indeed, receipts having multiple links to multiple documents, applets or other suitable items stored on a server or on different servers are very much contemplated, as illustrated by the examples described below.

Figure 4:
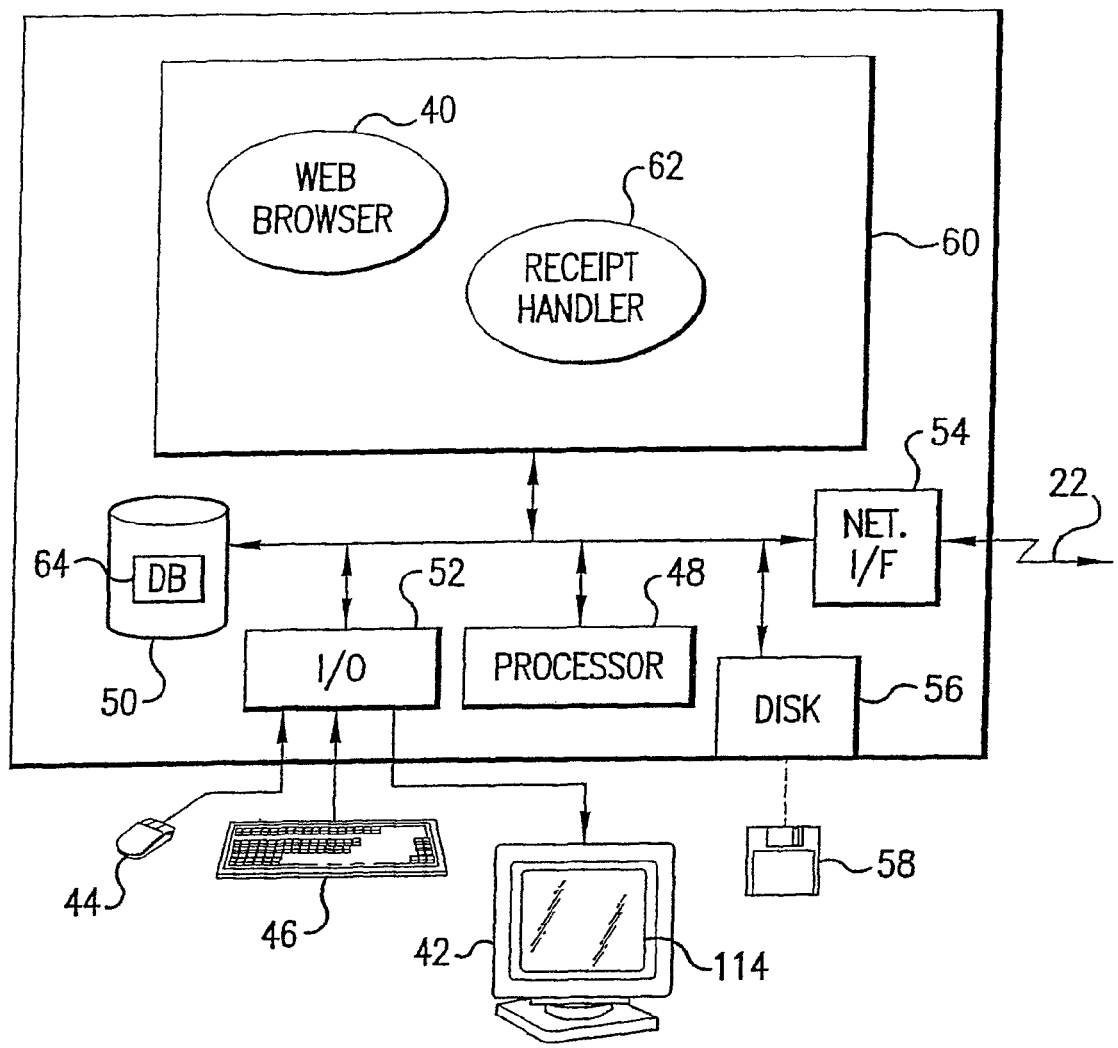
FIG. 4 illustrates a computer system operable by a buyer of goods or services in which electronic receipts are received.

As illustrated in FIG. 4, the client computer operated by buyer 20 can be a conventional personal computer on which a Web browser 40 operates. As well known in the art, a browser is a software program that allows a user to receive and view hypertext documents from a server. Received documents are displayed on the video monitor 42 of the computer or other suitable display. Common commercially available browsers such as NETSCAPE NAVIGATOR and MICROSOFT EXPLORER typically display a hyperlink in some distinguishing way, e.g. in a different color, font or style. Browsers associate hyperlinks with Internet target documents and, when the user activates a hyperlink, the computer transmits a request for that document. As is conventional, the computer includes a mouse 44 with which the user can activate displayed hyperlinks. The computer also include other hardware and software elements conventionally included in personal computers, such as a keyboard 46, a processor 48, disk storage device 50 such as a hard disk drive, input/output interfaces 52, a network interface 54, and a removable read/write storage device 56 such as a drive that uses a CD-ROM 58 or floppy disk. The software elements of the programmed computer, such as browser 40, are illustrated for purposes of clarity as executable in a main memory 60, but as persons skilled in the art will understand, they may not in actuality reside simultaneously or in their entireties in memory 60. The computer has other hardware and software elements of the types conventionally included in personal computers, such as an operating system, but are not shown for purposes of clarity. Note that software elements can be loaded into the computer via read/write storage device 56 or network 22.

The computer also has a receipt organizer or handler 62. Receipt handler 62 allows buyer 20 to collect, store, categorize, sort and view receipts such as receipt 26. The receipts are received via network 22 and can be stored by receipt handler 62 in a user receipt database 64 on disk storage device 50. Receipt handler 62 can convert receipt data to the formats understood by common commercially available financial software programs (not shown), such as the personal finance program QUICKEN, and download the data to those programs for further processing.

Although in the illustrated embodiment of the invention the computing device on which the buyer receives receipts is described as a conventional personal computer such as a desktop or laptop computer, in other embodiments of the invention the device can be any suitable type of device that has a hypermedia user interface, i.e., that allows a user to interact with documents through the use of hyperlinks. Also, note that the network can be wired, wireless or any suitable combination or hybrid of such media. Examples of suitable computing devices include those commonly referred to as personal digital assistants (PDAs), palmtop computers, and digital cellular telephones and other hybrid voice/data communication devices.

Figure 5:
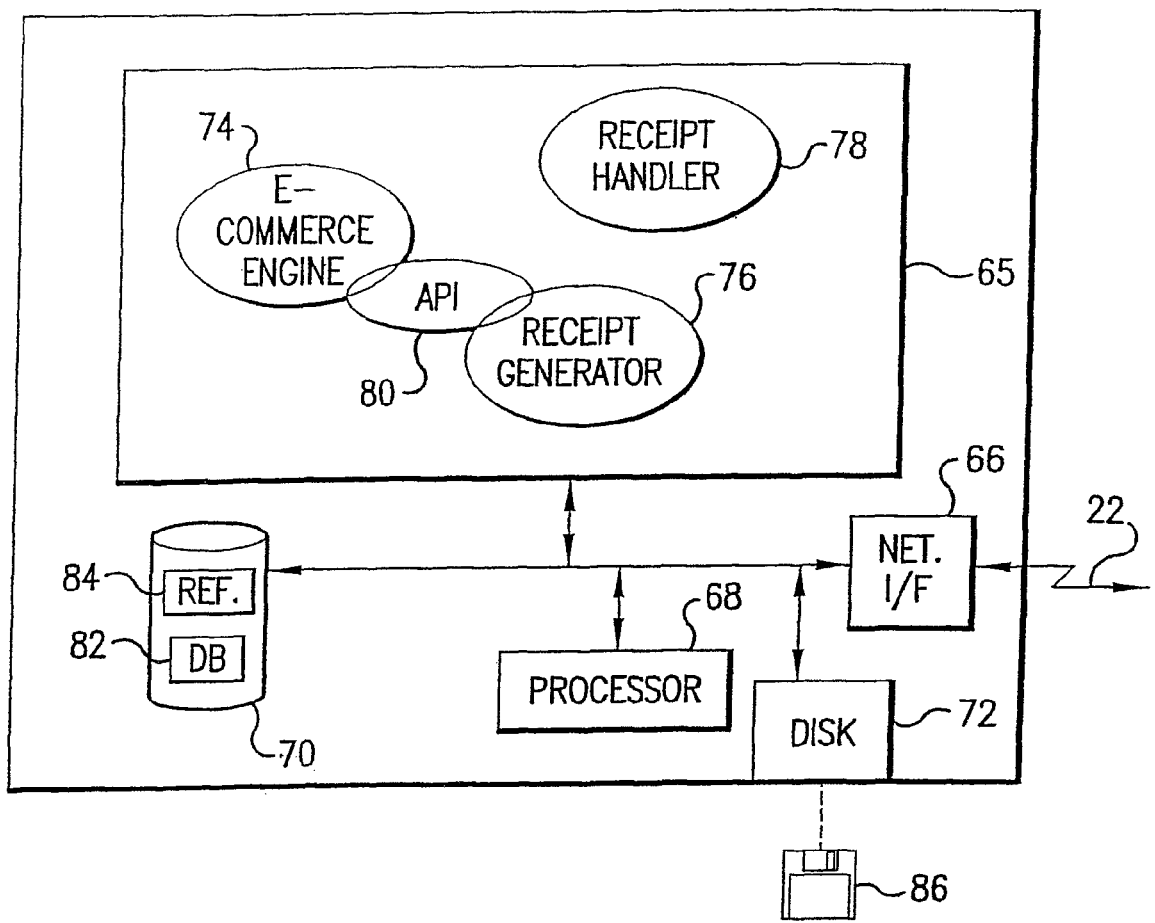
FIG. 5 illustrates a computer system operable by a seller of goods or services in which electronic receipts are issued.

As illustrated in FIG. 5, the system operated by seller 18 includes a server computer system of the type conventionally used by e-merchants to effect electronic commerce transactions. For purposes of clarity, the system is illustrated as a single or stand-alone server computer, but as persons skilled in the art will recognize, the system can include multiple layers of servers (e.g., front-end and back-end) and storage devices as is common in the art for such e-commerce server systems. Similarly, although not illustrated for purposes of clarity, the system can include a video monitor, keyboard, mouse and other user input/output devices of the types commonly included in such e-commerce server systems for use by system administrators and similar personnel. As a computer, it includes elements along the lines of a memory 65, network interface 66, processor 68, disk storage device 70, and a removable-medium read/write storage device 72.

The software elements of the programmed computer include an e-commerce engine 74, a receipt generator 76, and a receipt organizer or handler 78. Receipt handler 78 can use application program interfaces (APIs) 80 to interface with configuration reference tables 82, described in further detail below, which can be stored locally on disk storage device 70 as in the illustrated embodiment of the invention or, in other embodiments, can be stored remotely, e.g., on a server operated by another entity. APIs 80 also interface receipt handler 78 with applications that are part of e-commerce engine 74. In other words, e-commerce engine 74, which has overall control of the sales transaction with buyer 20, including controlling the exchange of appropriate Web forms with buyer 20, can invoke APIs 80 at the point in the transaction at which receipt 26 (FIG. 2) is to be generated. This, in turn, causes receipt generator 76 to generate receipt 26 using tables 82 as described in further detail below. In the illustrated embodiment of the invention, generated receipts are not only transmitted to the buyers that participated in the transaction but also copies are also stored in a receipt database 84. Note that software elements can be loaded into this server computer via a CD-ROM 86 or similar medium readable by read/write storage device 72 or can be loaded via network 22 from a remote source. Receipt handler 78 is similar to receipt handler 62 of FIG. 4 but can be used remotely via network 22 by more persons than buyer 20; anyone who completed a sales transaction with seller 18 can remotely access receipts pertaining to the transaction. Furthermore, others who did not participate in any transactions, such as market research firms and manufacturers of products offered by seller 18, may be permitted access to aggregate information generated by receipt handler 78 using data gleaned from the stored receipts, such as statistics and raw numbers without any information identifying the buyers. Because buyer privacy may be important, such other parties may not be permitted access to the receipts themselves.

Although in the illustrated embodiment of the invention the seller's computing system or server is accessible to remotely located users (i.e., buyers or third parties), in other embodiments, such as that described below with regard to FIGS. 15 and 16, it can be accessible to on-site users for some or all of the uses described above. For example, the system can be located in a seller's retail store for use by customers in returning products or otherwise accessing their stored receipts. Such an in-store system can be housed in a kiosk and can include a convenient user interface, such as a menu-driven touch-screen. Such a system can also issue coupons to customers, either by printing them or transmitting directly to the store's POS system, conduct customer satisfaction surveys, and perform other ancillary functions. A coupon offer directed to the buyer and associated coupon codes can be included in the receipts along with an associated hyperlink or any other suitable mechanism for producing or otherwise redeeming the coupon.

Figure 6:
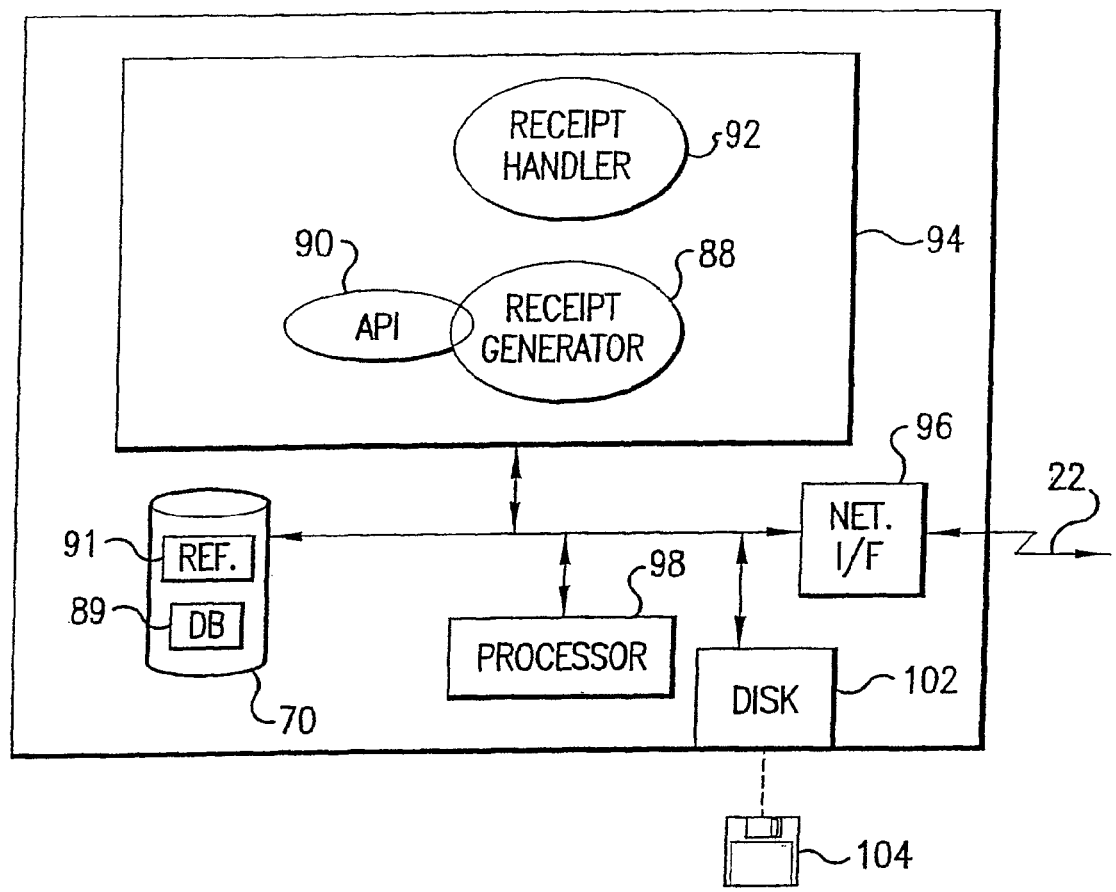
FIG. 6 illustrates a computer system operable by an originator entity that issues receipts but is not also a seller of the goods or services.

As illustrated in FIG. 6, the system operated by originator 24 is similar to that operated by seller 18 but does not engage in sales transactions. It includes only a receipt generator 88 similar to receipt generator 76 (FIG. 5), associated APIs 90 similar to APIs 80 (FIG. 5), and a receipt organizer or handler 92 similar to receipt handler 78 (FIG. 5). It likewise includes a receipt database 89 and configuration reference tables 91 similar to those described above with regard to seller 18. As in the merchant or e-commerce server system described above, for purposes of clarity, the system is illustrated as a single or stand-alone server computer, but persons skilled in the art will recognize that the system can have a more complex architecture and include other elements commonly included in commercial servers. As in the above-described system, it includes similar conventional computer elements along the lines of a memory 94, network interface 96, processor 98, disk storage device 100, and a removable-medium read/write storage device 102 for reading from and writing to a disk 104.

The major difference between this system of originator 24 and the system of seller 18 is that this system only generates and handles receipts and does not participate in the sales transactions themselves. Receipt generator 88 operates in response to instructions (received via network 22) from sellers to generate receipts. From the perspective of the buyers such as buyer 20, the role of seller 18 in issuing receipts is transparent. That is, buyer 20, in conducted a sales transaction with seller 18, is not normally informed of the source of receipts; buyer 20 may assume that the receipts he receives originate with seller 18 when in fact, in this instance, they originate with originator 24.

Receipt handler 88 is similar to receipt handler 78 of FIG. 5 but can be used remotely via network 22 by more buyers than those who participated in a sales transaction with seller 18; any buyer who completed a sales transaction with any seller (e.g., either seller 18 or seller 30 in the illustrated embodiment) can remotely access receipts pertaining to the transaction. Their access to such receipt-handling services may be conditioned upon complying with restrictions imposed by originator 24, such as by providing personal information and selecting a username and password. As in the system described above, others who did not participate in any transactions but who may wish to obtain aggregate receipt information for market research or other purposes may be granted access upon compliance with any conditions imposed by originator 24.

Note that in the illustrated embodiment of the invention not only originator 24 but also seller 18 is capable of generating and handling receipts. Nevertheless, in a similar embodiment, a given seller that is otherwise the same as seller 18 may not have such capability and may obtain receipt generation services (as well as receipt-handling services) from another entity, such as originator 24. In such embodiments, the seller can be essentially the same as seller 18 but has a system with APIs that cause a receipt generation instruction to be transmitted to originator 24. In response to such an instruction, originator 24 generates receipt 26 and transmits it to buyer 20 on behalf of that seller. It is contemplated that the seller pay a fee for receipt generation services.

Figure 7A:
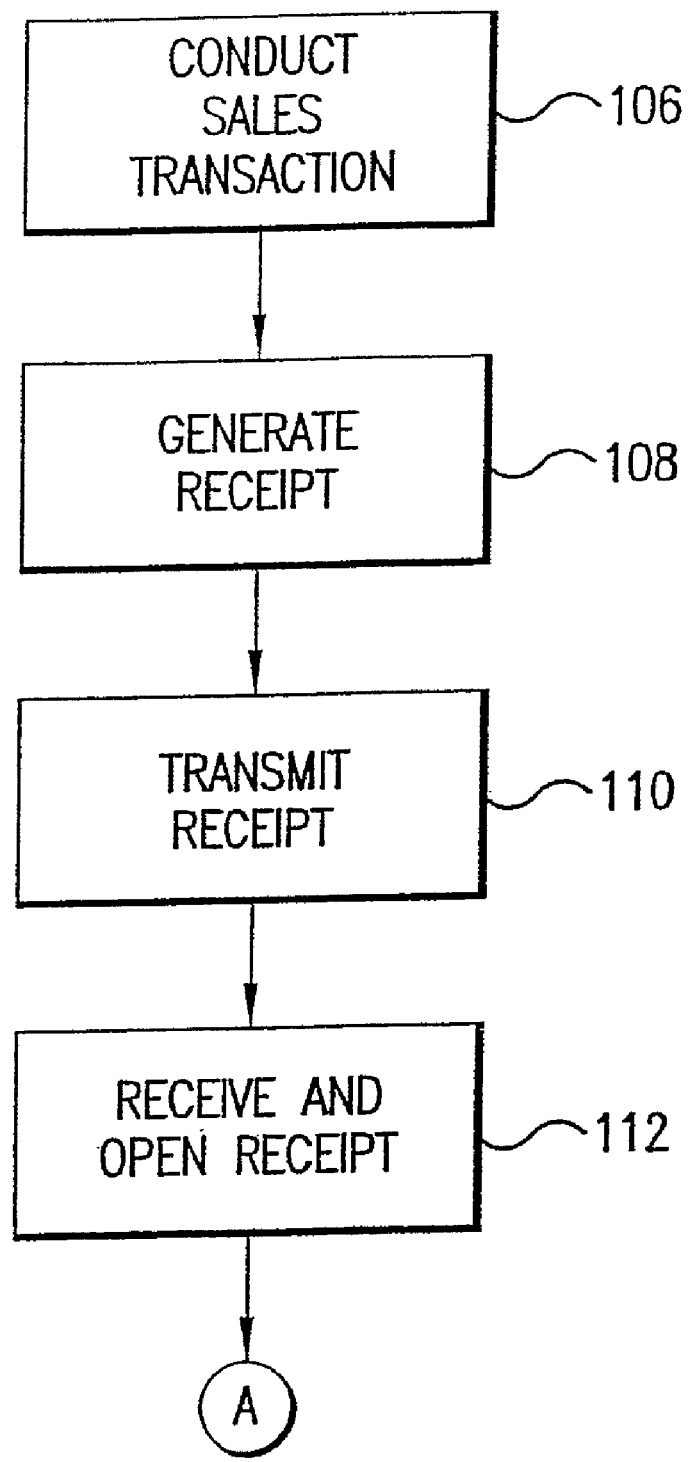
FIG. 7A is a flow diagram illustrating a method of operation of the system.

The methods described above perhaps can be more readily understood with reference to the flow diagram of FIG. 7A. At step 106 seller 18 and buyer 20 conduct a sales transaction. In the illustrated embodiment of the invention, buyer 20 shops a Web site operated by seller 18. In other words, the Web site presents pages (not shown) to buyer 20 in the conventional manner that illustrate or describe the products or services available for sale or otherwise induce buyer 20 to make a purchase. Browser 40 (FIG. 4) transmits requests for Web pages to seller 18, which in response transmits the requested pages to buyer 20, where they are presented to buyer 20 in the conventional manner on display 42. As an example, the Web site may be operated by a seller of consumer products such as consumer electronics, kitchen items and other household items. In the conventional manner, buyer 20 selects an item such as a stereo as a purchase. Buyer 20 may select other items before indicating he is finished shopping. A metaphor to shopping in a physical retail store that is sometimes used on e-commerce Web sites for this step of the transaction is "proceeding to checkout." In the checkout step of the transaction, buyer 20 submits payment information, such as a credit card number, and shipping address information. The transaction concludes in a conventional manner with buyer 20 receiving a Web page setting forth the purchases, the payment information and other information and asking buyer 20 to confirm by, for example, clicking on a "confirm" button. In response, receipt 26 is generated at step 108 and transmitted to buyer 20 at step 110. As noted above, in the illustrated embodiment of the invention (see FIG. 2) these steps are performed by seller 18 transmitting an instruction to originator 24 to issue receipt 26, and originator 24 generating and transmitting receipt 26.

In other embodiments, seller 18 itself can perform steps 108 and 110 without assistance from originator 24. In addition to transmitting receipt 26, originator 24 maintains a copy in database 89 (FIG. 6).

At step 112 buyer 20 receives and opens receipt 26. Like other Web documents received under control of browser 40, the opened receipt 26 is presented to buyer 20 on display 42 in hypertext format. (See FIG. 4.) Accordingly, buyer 20 can click on and otherwise interact with hyperlinks and other elements of receipt 26 using mouse 44 and keyboard 46.

Figure 9:
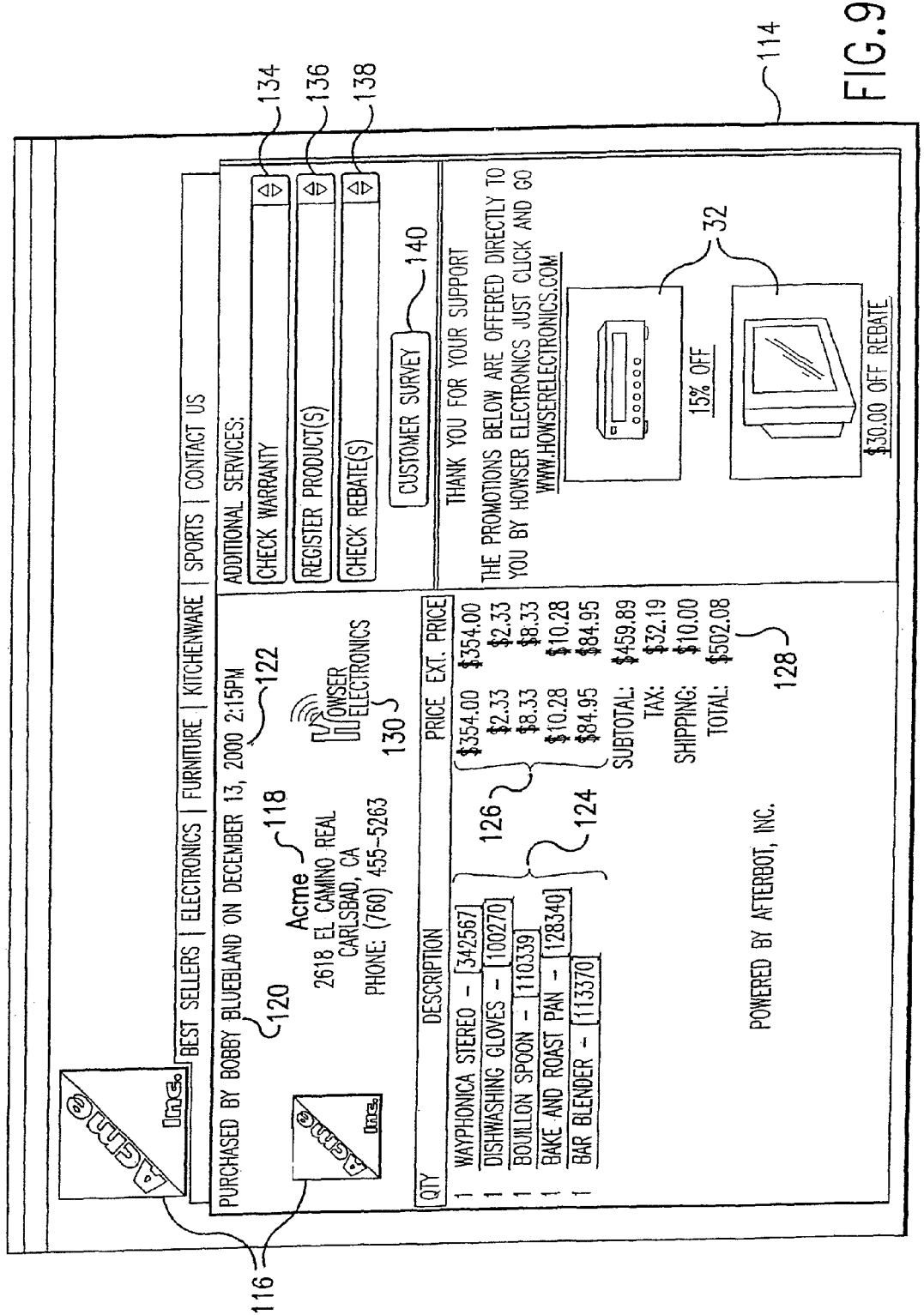
FIG. 9 illustrates a screen display representing a receipt.

Receipt 26 can have, for example, an appearance along the lines of that shown in FIG. 9 when opened and displayed in a browser window 114. This representation of receipt 26 includes, among other elements, representations of: the name or logo 116 and address 118 of seller 18, the name of buyer 120, the date of the sale, a list 124 of the purchases, a corresponding list of their sales prices 126, and the subtotals and total price paid 128. Note that these elements represent information that is essentially the information included in any conventional sales receipt. In addition to these elements are representations of the name or logo 130 of third party 32 and some products 132 offered for sale by third party 32. Also represented are a "check warranty" button 134, a "register product(s)" button 136, a "check rebates" button 138 and a "customer survey" button 140.

Products 132 are selected for inclusion by originator 24 when receipt 26 is generated. In the illustrated example, the products 132, a television and a stereo component, are commercially related to one of the items in list 124, the "Wavphonica Stereo—[item number] 342567," by virtue of all being used in the field of consumer entertainment electronics. Products 132 are selected in response to configuration reference tables 91 (FIG. 6), which in essence relates each product offered for sale by each seller to products that that seller deems to be commercially related to that product. In addition to products that are used in the same field, other suitable commercially related products 132 are accessory items for the stereo system, such as cables. Receipt generator 88 inputs to tables 91 the product that is the subject of the sales transaction or primary purchase. In response, tables 91 output one or more products 132 that are commercially related to the primary purchase. Receipt generator 88 then inserts representations of these products 132 into receipt 26. Buyer 20, in viewing the generated receipt 26, is thus induced by the representations of the selected products 132 to purchase one or more of them as secondary purchases.

Figure 7B:
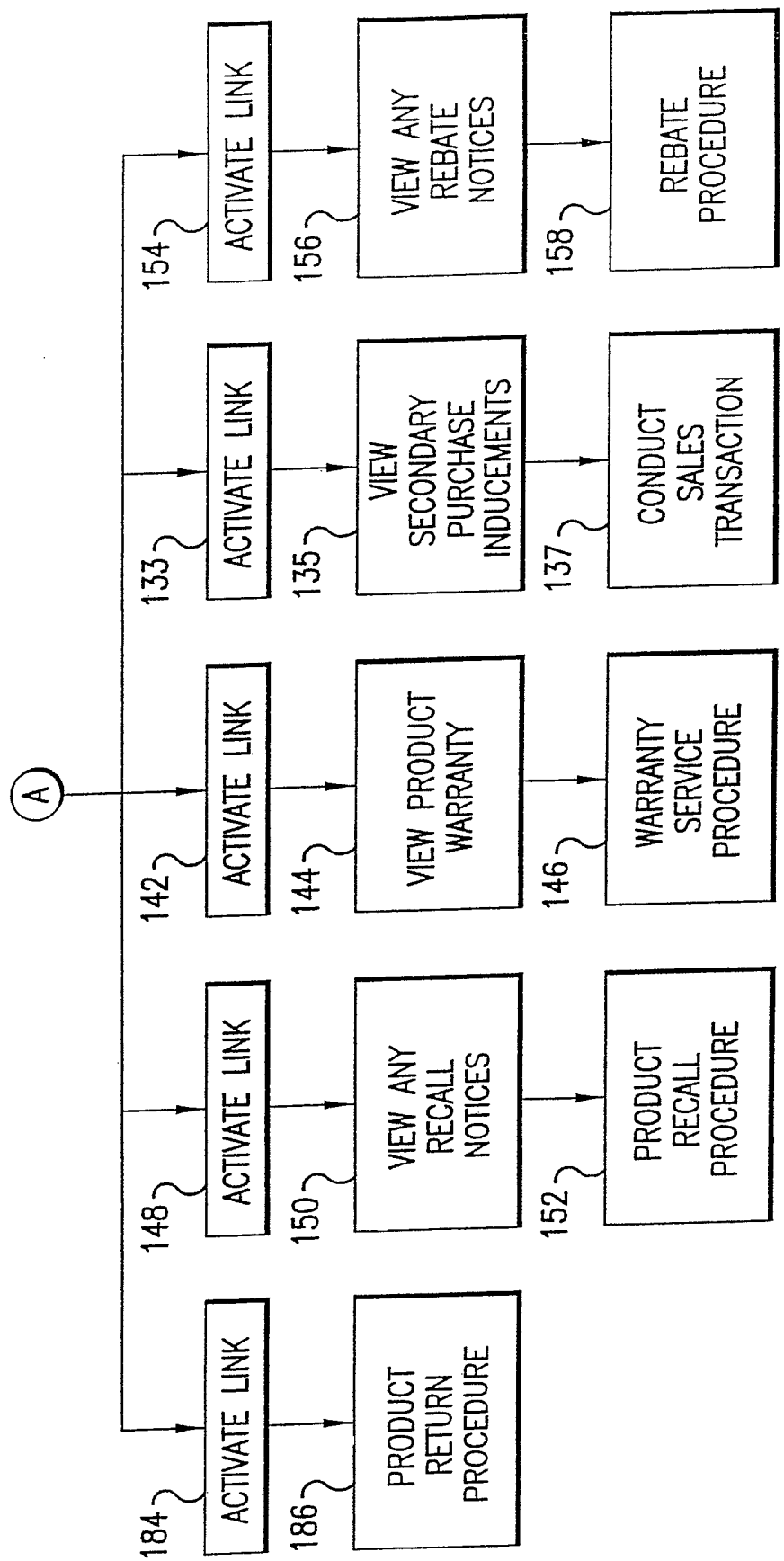
FIG. 7B is a continuation sheet of FIG. 7A.

To initiate the process of purchasing one of products 132, buyer 20 clicks on its representation, as indicated by step 133 in FIG. 7B. The representation is associated with an active hyperlink in receipt 26. Accordingly, in response to clicking on it, browser 40 (FIG. 4) transmits a request for a Web page that offers the product for sale. The Web page (not shown) can be located at a site operated by seller 18 or, alternatively, the manufacturer of the product or other third party such as a third party merchant. Although not illustrated for purposes of clarity, as indicated by step 135 and 137 in FIG. 7B, buyer 20 interacts with the site through a sequence of Web pages in the same manner as any conventional e-commerce sales transaction process, such as that described above. In other words, buyer 20 views information about the product available for secondary purchase, selects the product, provides payment information, and so forth. In instances in which the secondary sale is made by a third party merchant, i.e., not seller 18, it is contemplated that the third party merchant compensate seller 18 for what is in effect a referral of buyer 20. This compensation or commission can take the form of a fixed fee per referral, as a percentage of the price of the secondary purchase, or any other suitable form.

Buttons 134, 136, 138 and 140 provide further functionality. In response to clicking on any of buttons 134-140, buyer 20 is presented with a drop-down selection list with information similar to that of list 124 identifying the products purchased.

For example, as indicated by step 142 in FIG. 7B, in response to buyer 20 clicking on button 134 and selecting a product, an associated hyperlink in receipt 26 causes browser 40 to transmit a request for a Web page (not shown) that depicts the text of a warranty for the selected product. For example, buyer 20 could choose to view the manufacturer's warranty for the "Wavphonica stereo." As indicated by step 144 in FIG. 7B, buyer 20 views the warranty. The Web page can be located at a site operated by, for example, the manufacturer. With regard to FIG. 2, in such an example third party 32 is the manufacturer. As indicated by further step 146, if buyer 20 believes he is entitled to some action under the warranty, such as having the manufacturer service or replace the product, buyer 20 can interact with the warranty page to request initiation of such a warranty service procedure. The procedure may include returning the product to the manufacturer or an authorized service center. In such an instance, the procedure includes transmitting a label (not shown) to buyer 20 that he can print on a suitable printer attached to the computer and affix to the packaging in which the product is returned. The label includes all information necessary for the shipper to route the package and may contain additional information, such as a return authorization number, that is useful to the manufacturer.

In response to clicking on button 136 and selecting a product, an associated hyperlink causes browser 40 to transmit a request for a Web page (not shown) that is a form that buyer 20 can fill out with his name, address and other information and transmit back to the manufacturer to register the product. Product registration is a common mechanism used by manufacturers to obtain marketing information from purchasers of their products and also to keep the purchasers apprised of recalls or any other information in which the manufacturers believe the purchasers may be interested. If the manufacturer has provided a recall notice, buyer 20 can interact with the manufacturer's Web site to initiate return or service of the product under the manufacturer's recall procedure. (See FIG. 7B, steps 150 and 152.)

As indicated by steps 154, 156 and 158, in a similar manner button 138 provides a mechanism for buyer 20 to determine whether the manufacturer is offering a rebate on the purchase price. The associated link can be to the manufacturer's Web site.

Button 140 provides a similar mechanism for buyer 20 to respond to a customer survey (not shown) provided by the manufacturer or the seller through an associated hyperlink to the corresponding Web site.

Figure 10:
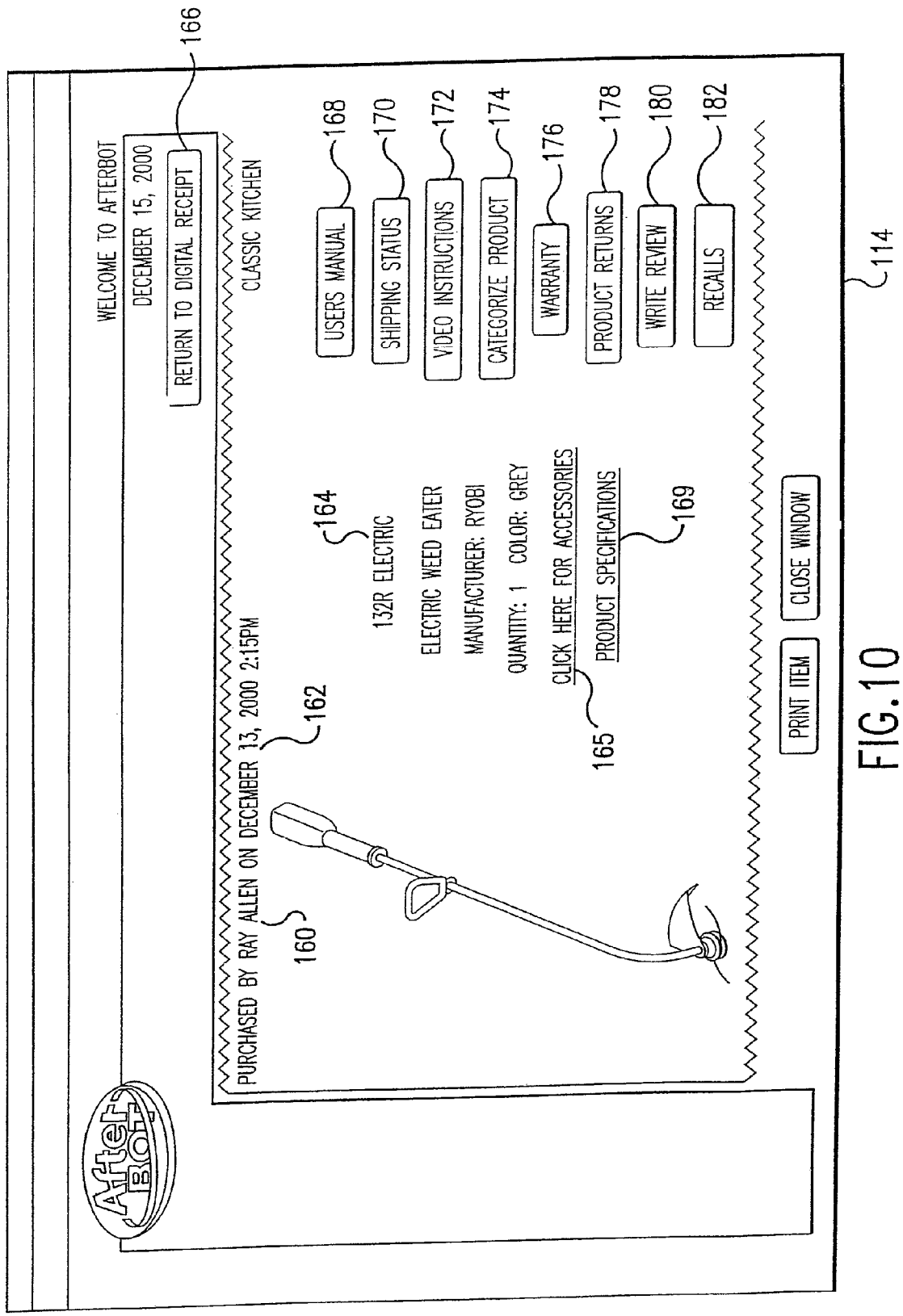
FIG. 10 illustrates a screen display representing further information regarding a purchased item listed on a receipt.

In response to selecting or clicking on a representation of a product listed in list 124, an associated hyperlink causes browser 40 to transmit a request to originator 24. In response, originator 24 provides an associated product-specific Web page that can have an appearance along the lines of that shown in FIG. 10. In the illustrated embodiment of the invention, this page provides information and options similar to those appearing on receipt 26 itself plus additional information and options. In other embodiments, all such information and options can be provided on the receipt or, alternatively, on an associated product-specific page such as this. Among the information provided on this page is: a representation of the name 160 of buyer 20, date of purchase 162 of the selected product, and product-identifying information 164.

In addition, the page includes a representation of an "accessories" hyperlink 165. In response to selecting or clicking on hyperlink 165, browser 40 is directed to a process provided by originator 24 that selects accessory products that are related to the selected product. Accessories are selected using configuration reference tables (FIG. 6) in the same manner described above with regard to selection of products 132. Buyer 20 is presented with an opportunity to purchase such accessories in the manner described above.

The page further includes a "return to digital receipt" button 166, a "users manual" button 168, a "shipping status" button 170, a "video instructions" button 172, a "categorize product" button 174, a "warranty" button 176, a "product returns" button 178, a "write review" button 180, and a "recalls" button 182. Some of these buttons initiate functions duplicative of those described above, such as "warranty" button 176 and "recalls" button 182. The returns procedure under button 178 includes, as described above, transmitting a label (not shown) to buyer 20 that buyer 20 can print and affix to the packaging in which the product is returned. Button 166, as the name implies, returns browser 40 to receipt 26 as represented in, for example, FIG. 9.

In response to clicking on button 168, an associated hyperlink causes browser 40 to transmit a request for a page (not shown) that depicts the text of a user's manual for the selected product. The hyperlink may be directed to the manufacturer's web site or another entity's web site. It is sometimes the case that an entity separate from the manufacturer of a product publishes manuals for the product. In either case, a third party 32 (i.e., neither seller 18 nor originator 24) supplies the manual to buyer 20. Note that a representation of a "product specifications" hyperlink 169 can provide a similar function. In response to clicking on hyperlink 169, specifications for the selected product are retrieved from a suitable, e.g., the manufacturer's, Web site.

In response to clicking on button 170, an associated hyperlink causes browser 40 to transmit a request for a page (not shown) that indicates the shipping status of the purchase made by buyer 20. Seller 18 includes suitable methods in its e-commerce engine 74 to respond to such a request by determining the shipping status and transmitting it to buyer 20. Automated checking of shipping status of an order is in and of itself well known in the art and thus readily capable of implementation by one of ordinary skill.

Button 172 provides functionality similar to that of button 168, but rather than a textual or graphical instruction manual, the information is provided in video or movie format.

In response to clicking on button 174, an associated hyperlink causes browser 40 to transmit a request for a page (not shown) that allows buyer 20 to associate a category with the purchased item. The hyperlink may be directed to the web site of either originator 24 or seller 18, depending on which entity's receipt organizer service buyer 20 is using. The receipt organizer is described in further detail below. The category aids buyer 20 in searching and organizing receipts. For example, buyer 20 can associate the selected item with a "gift" category. Then, using the organizer service, buyer 20 can search for all receipts of the category "gift."

"Product returns" button functions similarly to "warranty" button 134 but does not include a step whereby buyer 20 can view a warranty. (See FIG. 7B, steps 184 and 186.) Rather, buyer 20 uses button 134 to initiate a procedure to return the selected product for reasons other than warranty service. For example, seller 18 may have a policy that allows buyers to return merchandise with which buyers are unsatisfied. Alternatively to seller 18, the return procedure can be provided by third party 32.

In response to clicking on button 180, an associated hyperlink causes browser 40 to transmit a request for a page (not shown) that allows buyer 20 to enter a review of the product, i.e., the buyer's opinion of the merits of the product. The form can be returned to originator 24 and posted on the Web site. Alternatively, the review can be transmitted to a Web site of seller 18 or third party 32. Other potential buyers can read the reviews of a product before deciding whether to purchase it.

Figure 8:
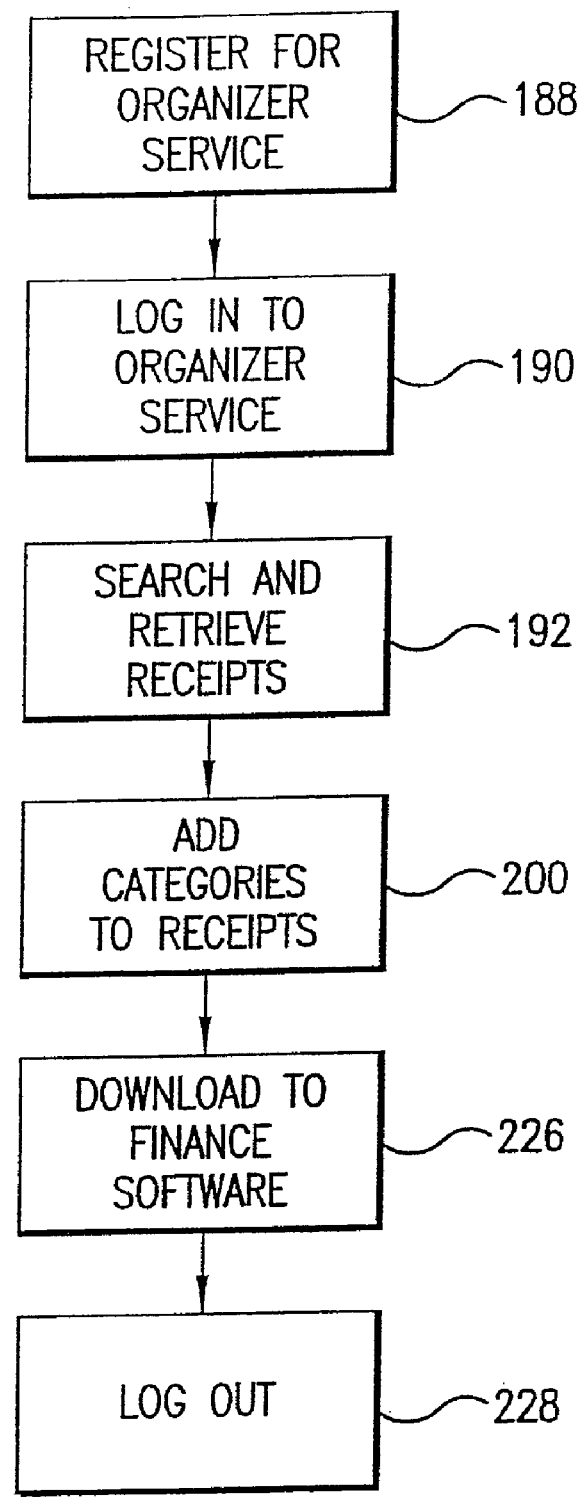
FIG. 8 is a flow diagram illustrating a method for organizing and otherwise handling electronic receipts.

As illustrated in FIG. 8, buyer 20 can participate in a receipt organizer service operated by an entity such as originator 24. The service is accessed via the Web using the computer and its browser 40 in the conventional manner described above. Receipt handler 92 (FIG. 6) of originator 24 controls the receipt organizer functions described below. At step 188 buyer 20 accesses a Web site of originator 24 and interacts with a home page (not shown) that includes, among other options, registering for the organizer service. In essentially the same manner in which one registers for conventional Web-based services, buyer 20 completes a form in which he provides personal information such as his name and address and selects a user name and password. In response to submitting this form, originator 24 sets up an account for buyer 20. Thereafter, upon accessing the Web site home page, buyer 20 can select the option of logging in to the receipt organizer service by providing his user name and password, as indicated by step 190. After logging in, buyer 20 is presented with a page that provides several options, such as "receipts" and "reports." At step 192 buyer 20 can, for example, select the "receipts" option. In response, originator 24 searches for and retrieves receipts for purchases made by buyer 20 and provides them in a suitable fog mat, such as a chronological listing.

FIG. 11 illustrates an exemplary browser window 194 in which such a chronological receipt listing is displayed in response to selecting the "receipts" option. Each line in the listing represents a transaction for which a receipt was issued. A column labeled "merchant" identifies the seller by name. A column labeled "purchase date" identifies the date of the transaction. A column labeled "shipping info" provides information indicating the status of the shipment for that transaction. A column labeled "total price" indicates the price paid for the goods or services. A column labeled "receipt type" indicates manually input receipts or automatically generated receipts. Buyer 20 can select any transaction by clicking on one of the lines.

Figure 12A:
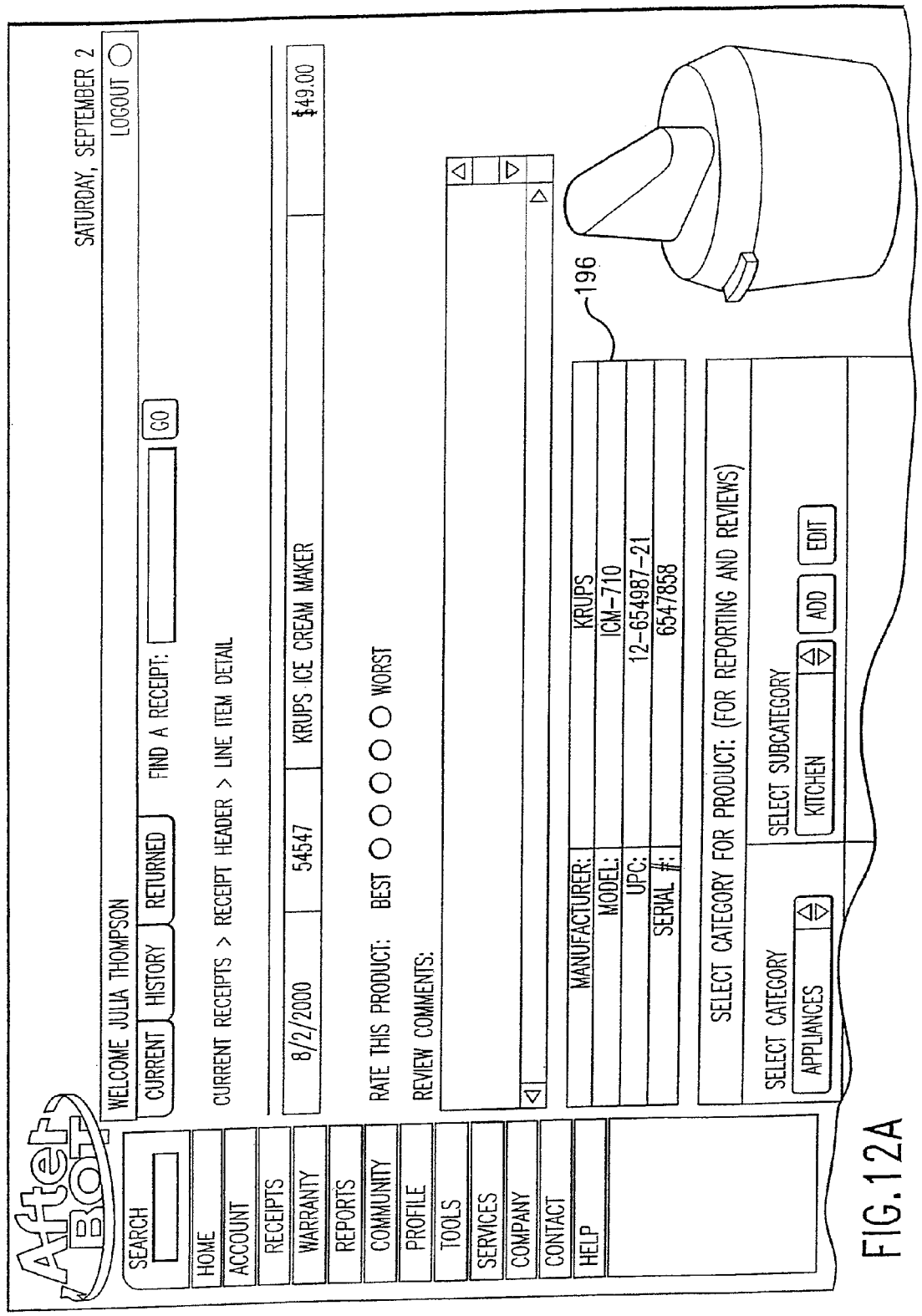
FIG. 12 illustrates a screen display representing further information regarding one of the buyer's receipts.

In response to selecting one of the lines, an associated hyperlink causes browser 40 to request a page providing further information with regard to the corresponding product or service purchased. Such a page can have an appearance along the lines of that illustrated in FIG. 12. Among other information, this page includes identifying information 196 such as manufacturer and model number, Universal Product Code (UPC), SKU and serial number. It further includes a group 198 of buttons that allow buyer 20 to categorize the purchase as described above. Using these buttons, at step 200 buyer 20 can select not only a category (e.g. "Appliance") but also a sub-category (e.g., "Kitchen"). Buyer 20 can further select an event to associate with the purchase (e.g., "Personal") and a sub-event (e.g., "Gift"). In addition, buyer 20 can select a recipient and sub-recipient to associate with the purchase. Another group 202 of buttons are included for the similar purpose of adding an indication whether the purchase is tax-deductible or otherwise tax-related and whether the purchase is to be considered part of the inventory of items owned by buyer 20 (for example, for purposes of substantiating claims under a homeowner's personal property insurance policy). The categorization and other information added by buyer 20 is added or attached to the record of the transaction in database 89. The page also can include buttons 204 that initiate the functions described above for obtaining warranty service, user manuals, returns, and the like. The page can further include an inducement 206 to purchase accessories for the product. The accessories are determined using product reference tables 91 in the same manner described above.

Figure 13:
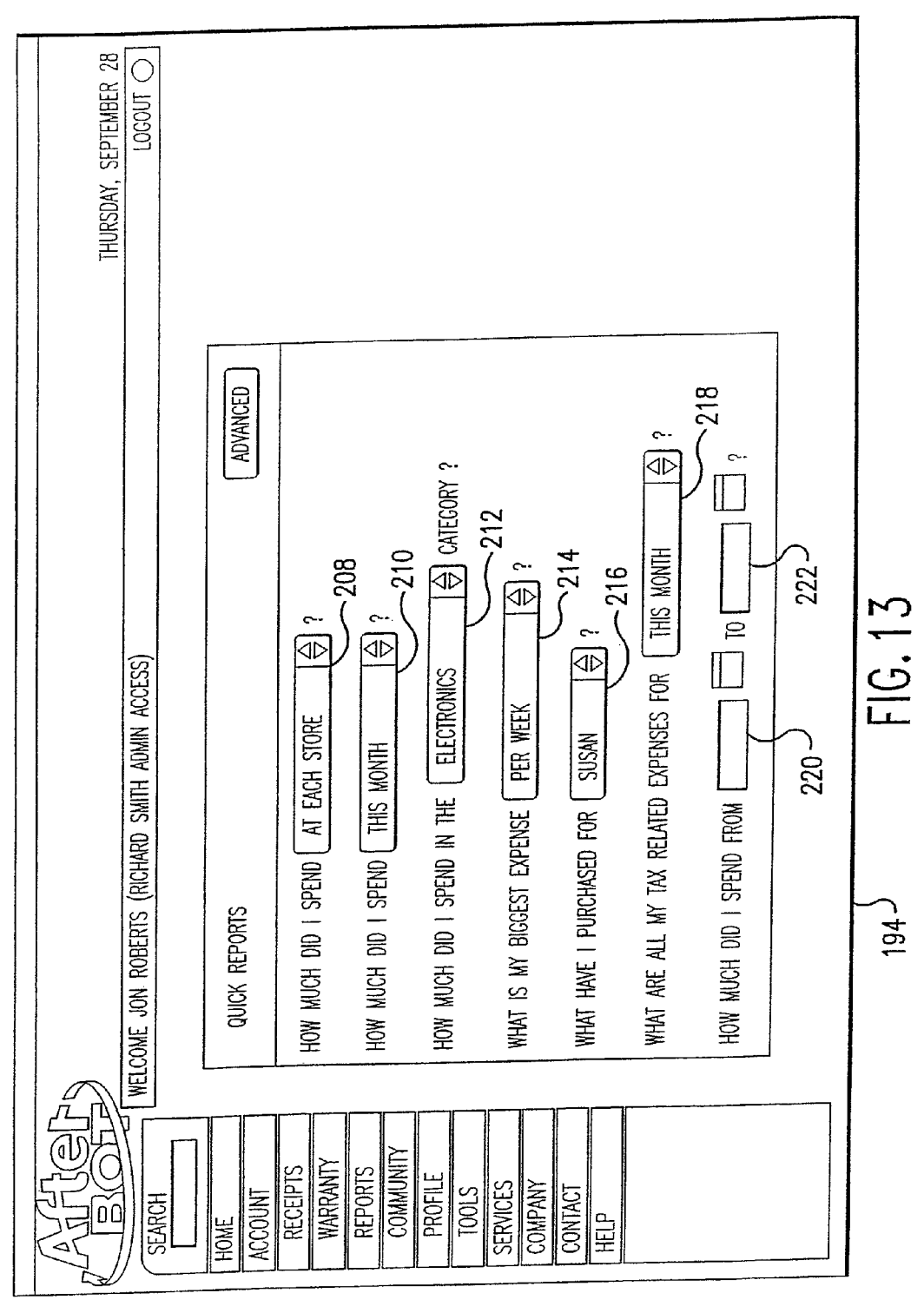

Another option that buyer 20 can select from the options presented on the receipt organizer service home page is "reports." In response to selecting "reports" originator 24 transmits to buyer 20 a page such as that illustrated in FIG. 13. Button 208 allows buyer 20 to query how much he spent at a selectable group of sellers or individual seller. Button 210 allows buyer 20 to query how much he spent during a selectable time period, such as the current month, current week or current year. Button 212 allows buyer 20 to query how much he spent in a selectable product category (e.g., "electronics"). Button 214 allows buyer 20 to query what was his biggest expense. Button 216 allows buyer 20 to query what he purchased for a selectable recipient. Button 218 allows buyer 20 to query what are his tax-related expenses. Similarly, two input boxes 220 and 222 allow buyer 20 to enter starting and ending dates to query how much he spent during the time interval between them. In response to clicking one of buttons 208-218 and making a selection, browser 40 transmits a request to originator 24 that indicates the query. In response, originator 24 queries database 89 and tallies the information requested by buyer 20.

Originator 24 transmits the information back to buyer 20, where it is presented in a suitable Web page. For example, if buyer 20 clicks on button 216 and selects from the displayed options a recipient named "Susan," buyer 20 receives in response a Web page such as that illustrated in FIG. 14. Records of all purchased items to which buyer 20 attached a recipient categorization of "Susan" are displayed. For each listed item, the purchase date, quantity, receipt number, description, price, seller or vendor, category, event, recipient (in this example, "Susan"), tax-related status, and home (or business) inventory status are displayed. Note that these are some of the categorizations that buyer 20 added in accordance with the procedure described above with regard to FIG. 12.

Note that the page listing the items purchased for the selected recipient (in this example, "Susan") has an "Export to EXCEL" button 224. In response to clicking button 224, browser 40 transmits a request to download or export the displayed data to the well-known spreadsheet program MICROSOFT EXCEL. As persons skilled in the art will recognize, a similar button can be included to export the data to any suitable application software, such as a personal finance program. An example of such a program is QUICKEN from Intuit, Inc. In FIG. 8, step 226 indicates this procedure.

To facilitate receipt data transfer, such as exporting the receipt data to finance and spreadsheet programs and the like, the receipt data is stored in database 89 in a standard or uniform format. This feature is primarily important in embodiments of the invention in which sellers generate and transmit the receipts rather than having a separate originator entity (e.g., originator 24) perform those functions. In such embodiments, there is a party similar to originator 24 in that it includes receipt-handling and receipt-storing functions but different from originator 24 in that it does not itself generate receipts. Rather, such a party receives copies of receipts directly from sellers and stores them in the receipt database where they can be accessed by buyers, sellers and other entities in the manner described below. In such embodiments of the invention, when a receipt is received, it is converted from whatever format that seller may use into a standard or uniform format for storage in the receipt database. Because all receipts stored in the database have the same format, it is a straightforward matter to convert their data to a format compatible with the external program, e.g., QUICKEN. Such standardization also facilitates data mining.

At any time after logging in, buyer 20 can log out, as indicated by step 228. It should be understood that not all method steps described above need be performed in any given session, i.e., the interval during which buyer 20 is logged in. For example, buyer 20 may log in and download receipt data to an application program without performing the categorizing step. Likewise, the steps can be performed in orders or sequences other than that described above, which is intended to be merely illustrative.

As illustrated in FIG. 15, a system for generating an electronic receipt 230 comprises a computer system 232, and a POS system 234. POS system 234 is used to conduct a sales transaction and provides a physical receipt 236. Physical receipt 236 comprises a transaction identifier 238. Transaction identifier 238 can comprise a text and/or numeric string of characters 240 discernable and readable to a human eye or can comprise in alternate form a bar code 242 readable by an optical scanner 244.

Computer system 232 comprises a processor 246, a main memory 248, a storage device 250, an input and output interface 252. Software elements comprising a receipt handler 254, an electronic-receipt generator 256, and a transaction identifier interface 258 are illustrated for purposes of clarity as executable in main memory 248, but as persons skilled in the art will understand, they may not in actuality reside simultaneously or in their entireties in main memory 248. Computer system 232 is illustrated as a computer system housed within a single unit. It should be understood however, that the various above-detailed elements of computer system 232 can be distributed among any number of computing units and can include multiple layers of servers, processors, and storage devices as is common in the art for such electronic communication and e-commerce computer systems. Although not illustrated for purposes of clarity, computer system 232 can include a video monitor, keyboard, mouse, and other user input/output devices of the types commonly included in such systems for use by system administrators and similar personnel. Although illustrated as separate, computer system 232 and POS system 234 can be included in a single system existing as a distributed computer network or existing as a single unit located at a point of sale.

POS system 234 communicates with input and output interface 252 via a connection 260 which can comprise a computer network, such as, for example the Internet or any sub-network of the Internet, or a local area network (e.g., within a retail store). Electronic-receipt generator 256 generates electronic receipt 230 in the same manner as described above with regard to other embodiments of the invention. Electronic receipt 230 comprises transaction identifier 238 and can comprise additional information, such as the date and description of a transaction, the identity of a buyer, and the identity of a seller. Transaction identifier interface 258 communicates with POS system 234 and electronic-receipt generator 256 to ensure that transaction identifier 238 on physical receipt 236 is the same as that of electronic receipt 230.

In some embodiments of the invention, it can be electronic-receipt generator 256 that generates transaction identifier 238 and provides it to transaction identifier interface 258, while in other embodiments it can be POS system 234 that generates and provides transaction identifier 238 to transaction identifier interface 258.

Electronic receipt 230 can be stored in a database recorded in storage device 250. Storage and retrieval of electronic receipt 230 are facilitated by receipt handler 254.

Access to electronic receipt 230 is available through a computing device 262 to any user of the device provided with sufficient information from physical receipt 236. Sufficient information comprises transaction identifier 238 and can further comprise other required information, for example a sales price 264 or a date of sale (not shown). Transaction identifier 238 in the form of characters 240 can be entered manually into computing device 262 through the use of, for example, a keyboard or touch-screen (not shown). Transaction identifier 238 in the form of characters 240 or in alternate form of bar code 242 can be entered into computing device 262 using optical scanner 244. Optical scanner 244, and characters 240 or bar code 242 can be selected from optical character recognition (OCR) technologies and standards which are commercially available and known to include hand-held and counter mounted optical scanners.

Computing device 262 communicates with input and output interface 252 of computer system 232 via a connection 268 which can comprise a computer network, such as, for example the Internet or any sub-network of the Internet, or a local area network (e.g., within a retail store). A provision of transaction identifier 238 and any other required information to computer system 232 by computing device 262 will cause receipt handler 254 to retrieve electronic receipt 230 from storage device 250 and transmit it to computing device 262. The information of electronic receipt 230 will then be available to a user through some delivery means, for example a visual display screen (not shown).

Computing device 262 can be a personal computer (PC), a personal digital assistant (PDA), a digital cellular phone, or any other device with data transmission, reception, and delivery means, such as a computer with a touch-sensitive screen (not shown) at a customer service desk. As noted above, embodiments in which computing device 262 is a PDA or similar device, a touch-screen (not shown) can be provided via which the user can input information as is conventional in many such devices. Computing device 262 can be a single device as illustrated in FIG. 15, or can be two or more separate devices. Transaction identifier 238 can be provided by and electronic receipt 230 subsequently received by separate devices functioning collectively within the scope of computing device 262.

Computing device 262 can be a kiosk provided by a retailer or other business for customer self-service use or can be used by a customer service agent on behalf of a customer. A kiosk can be provided, for example, within a retail store or facility of the same location as POS system 234 or at an alternate location convenient to a customer, a retailer, or both.

Figure 16:
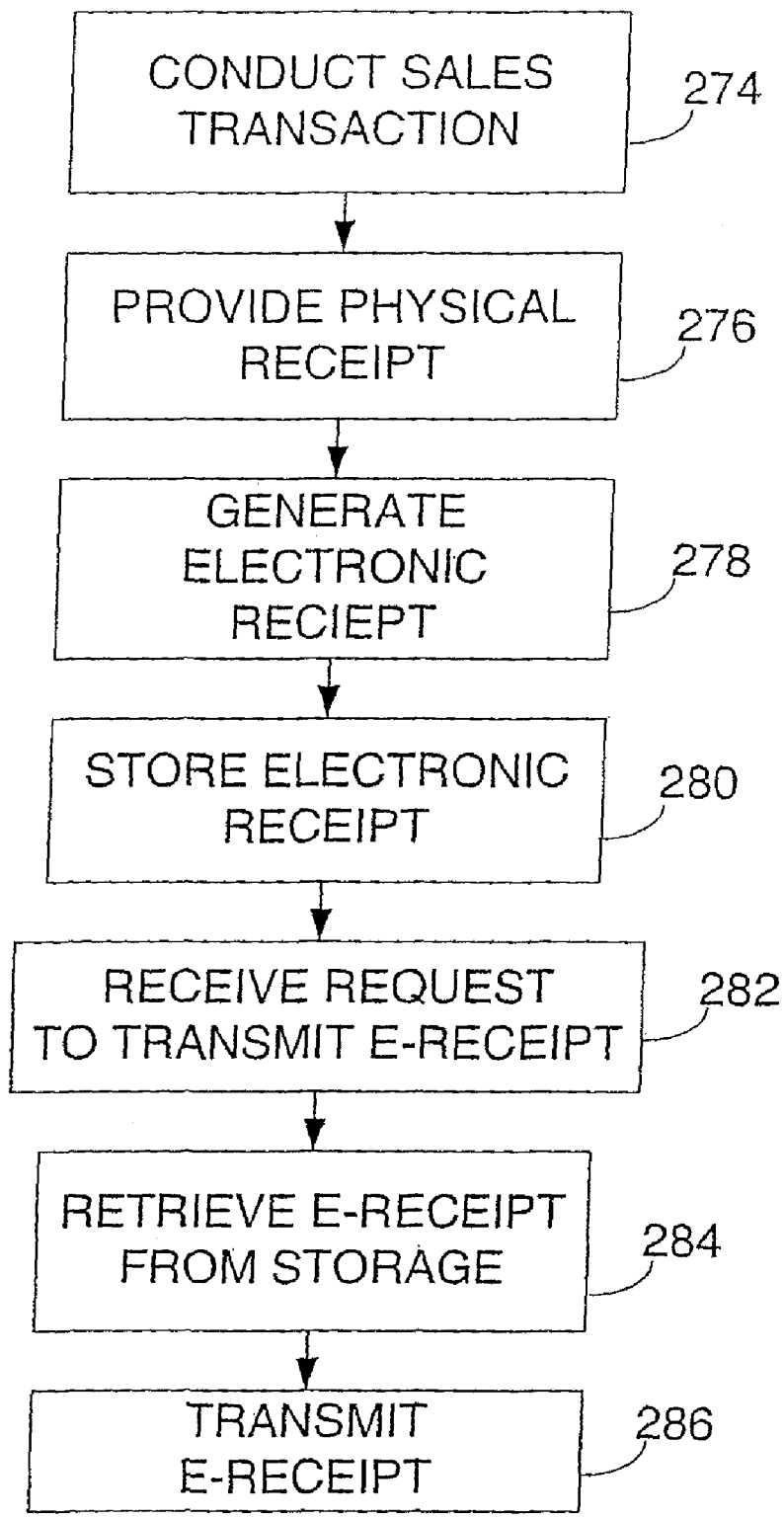
FIG. 16 illustrates a system with which an electronic receipt is provided to a buyer.

The methods described above perhaps can be more readily understood with reference to the flow diagram of FIG. 16. At step 274 a sales transaction is conducted. For example, a product or service can be purchased by a buyer from a seller. Physical receipt 236 (FIG. 15) is provided at step 276. A buyer can retain physical receipt 236 as a record of a transaction and associated transaction identifier 238 (FIG. 15). Electronic receipt 230 (FIG. 15) is generated at step 278. The generation of electronic receipt 230 at step 278 need not follow chronologically the provision of physical receipt 236 at step 276. Steps 276 and 278 can occur essentially simultaneously or one before the other in any order so long as physical receipt 236 and electronic receipt 230 each include transaction identifier 238. Electronic receipt 230 is stored in a storage device 250 (FIG. 15) by receipt handler 254 (FIG. 15) at step 280.

A request for transmission of stored electronic receipt 230 is received at step 282. For example, a buyer can seek access to electronic receipt 230 by using a personal computer, PDA, telephone, or any other suitable device as computing device 262 (FIG. 15). A buyer can also seek access to electronic receipt 230 by visiting a retail location of a seller where a kiosk is provided. When a request includes transaction identifier 238 then receipt handler 254 retrieves at step 284 electronic receipt 230 from storage device 250 and transmits at step 286 electronic receipt 230 to computing device 262 (FIG. 15).

Computing device 262 can be operated by a buyer involved in a sales transaction of step 274, or a customer service representative or employee of a seller acting on a buyer's behalf, or any person or persons who alone or collectively possess physical receipt 236 and seek access to electronic receipt 230. One or more devices can be used to provide a request received at step 282 and receive electronic receipt 230 transmitted at step 286. For example, a buyer can use a PC to provide a request within an email message specifying transmission of electronic receipt 230 to any desired email or voicemail account.

Figure 17:
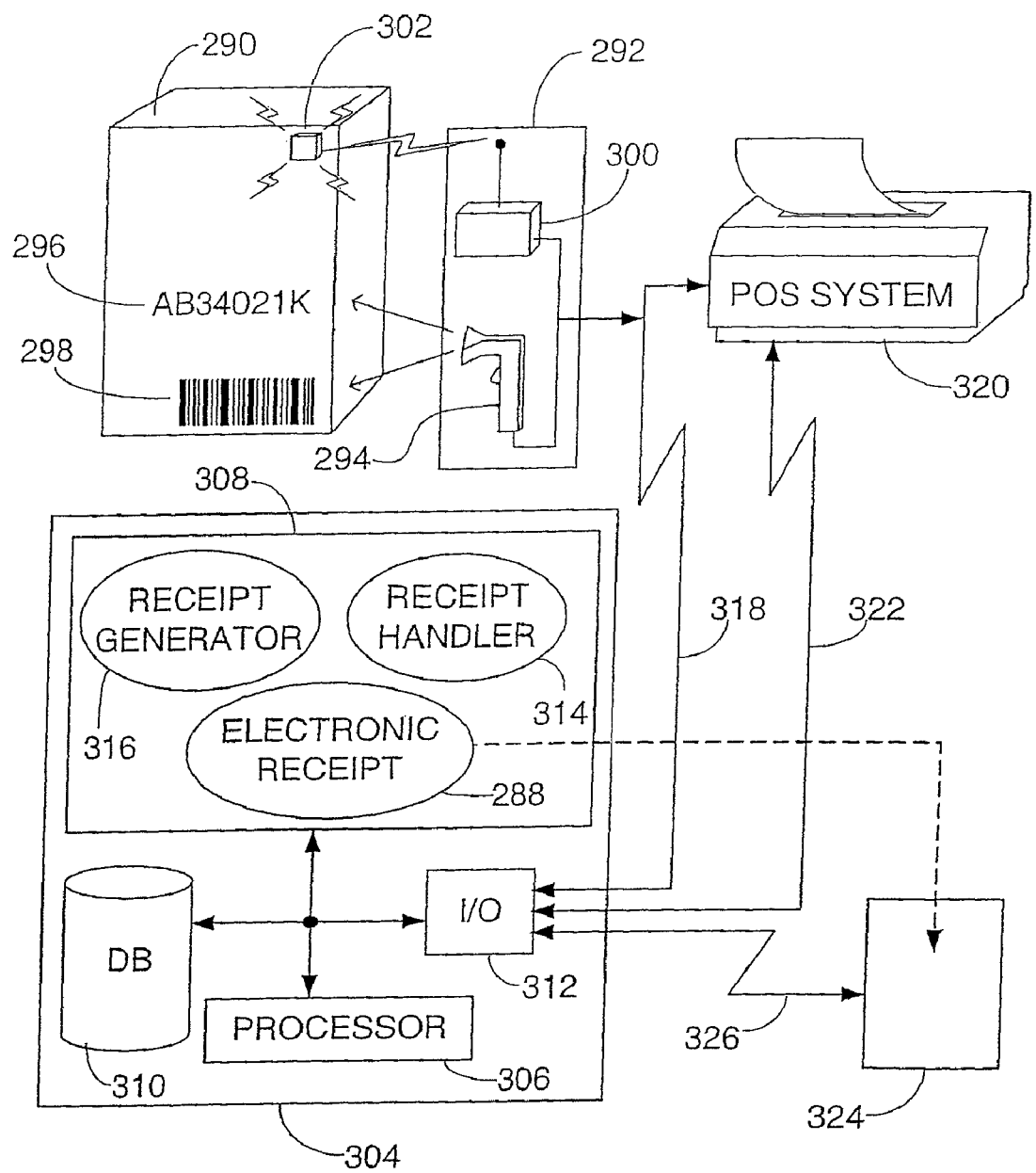
FIG. 17 illustrates a system with which product information is provided to a buyer.

A system for generating an electronic receipt 288 is illustrated in FIG. 17. An electronic collector 292 electronically collects product information directly from a product 290. Product information can comprise a product model identification and/or a unique serial number of the product, a UPC code, or any other information about the product.

Electronic collector 292 can comprise an optical scanner 294 which emits light and collects a reflected light signal for the electronic optical character recognition (OCR) of a text and/or numeric string of characters 296 on or optically accessible within product 290. Alternately, product 290 can be marked with bar code 298 which can be scanned by optical scanner 294. Optical scanner 294, and characters 296 or bar code 298 can be selected from OCR technologies and standards which are commercially available and known to include hand-held and counter-mounted optical scanners.

In an alternative embodiment, electronic collector 292 comprises a radio-frequency (RF) device 300 which receives the transmission of an RF tag 302 on or within product 290. RF tag 302 can be of a passive type such as a transponder which is activated by a transmission signal or RF device 300 or RF tag 302 can be of an active type such as a transponder powered by a battery. RF device 300 and RF tag 302 can be selected from known and commercially available technology.

Product 290 can comprise an item exchanged from a seller to a buyer. Product 290 can further comprise packaging enclosing, attached to, enclosed within, or associated with an item exchanged. Thus, the term "product," as used in this patent specification, means the product itself or its packaging or both. Furthermore, product 290 can comprise an item indicative of a product or service exchanged or to be exchanged. For example, product 290 can comprise a purchase value certificate or voucher for purchase or rental of an item, property, or service already selected or to be selected later by a holder of product 290.

A computer system 304 comprises a processor 306, a main memory 308, a storage device 310, and an input and output interface 312. Software elements comprising a receipt handler 314, and an electronic-receipt generator 316 are illustrated for purposes of clarity as executable in main memory 308, but as persons skilled in the art will understand they may not in actuality reside simultaneously or in their entireties in main memory 308. Computer system 304 is illustrated as a computer system housed within a single unit. It should be understood however, that the various above-detailed elements of computer system 304 can be distributed among any number of computing units and can include multiple layers of servers, processors, and storage devices as is common in the art for such electronic communication and e-commerce computer systems. Although not illustrated for purposes of clarity, computer system 304 can include a video monitor, keyboard, mouse, and other user input/output devices of the types commonly included in such systems for use by system administrators and similar personnel. Although illustrated as separate, computer system 304 and a POS system 320 can be included in a single system existing as a distributed computer network or existing as a single unit located at a point of sale.

Product information collected directly from product 290 by electronic collector 292 can reach computer system 304 directly from electronic collector 292 via a connection 318. Alternatively, product information collected can reach computer system 304 through POS system 320, which conducts a transaction of product 290, via a connection 322.

Electronic-receipt generator 316 generates electronic receipt 288 in the same manner as described above with regard to other embodiments of the invention. Electronic receipt 288 comprises all of the product information, or a subset thereof, collected directly from product 290 by electronic collector 292. Electronic receipt 288 can comprise additional information, such as the date of the transaction of product 290, a description of product 290, the identity of a buyer, and the identity of a seller. Receipt handler 314 can store electronic receipt 288 within storage device 310.

Access to electronic receipt 288 is available through a computing device 324. Computing device 324 communicates with input and output interface 312 via a connection 326. Connections 318, 322, and 336 can separately or together comprise a computer network, such as, for example the Internet or any sub-network of the Internet, or a local area network (e.g., within a retail store).

Computing device 324 can be a personal computer (PC), a personal digital assistant (PDA), a digital cellular phone, or any other device with data transmission and reception capabilities and data display, presentation, or relay means, such as a display screen, available to a user. Computing device 324 can be a single device as illustrated in FIG. 17, or can be two or more separate devices.

In one embodiment of the invention, computing device 324 provides to computer system 304 a request for access to electronic receipt 288. In other embodiments of the invention, electronic receipt 288 is automatically transmitted to computing device 324 by computer system 304. Automatic transmission can occur upon generation of electronic receipt 288 or can occur later with storage device 310 storing electronic receipt 288 between the times of its generation and transmission. Receipt handler 314 conducts the transmission and any storage and retrieval of electronic receipt 288.

Figure 18:
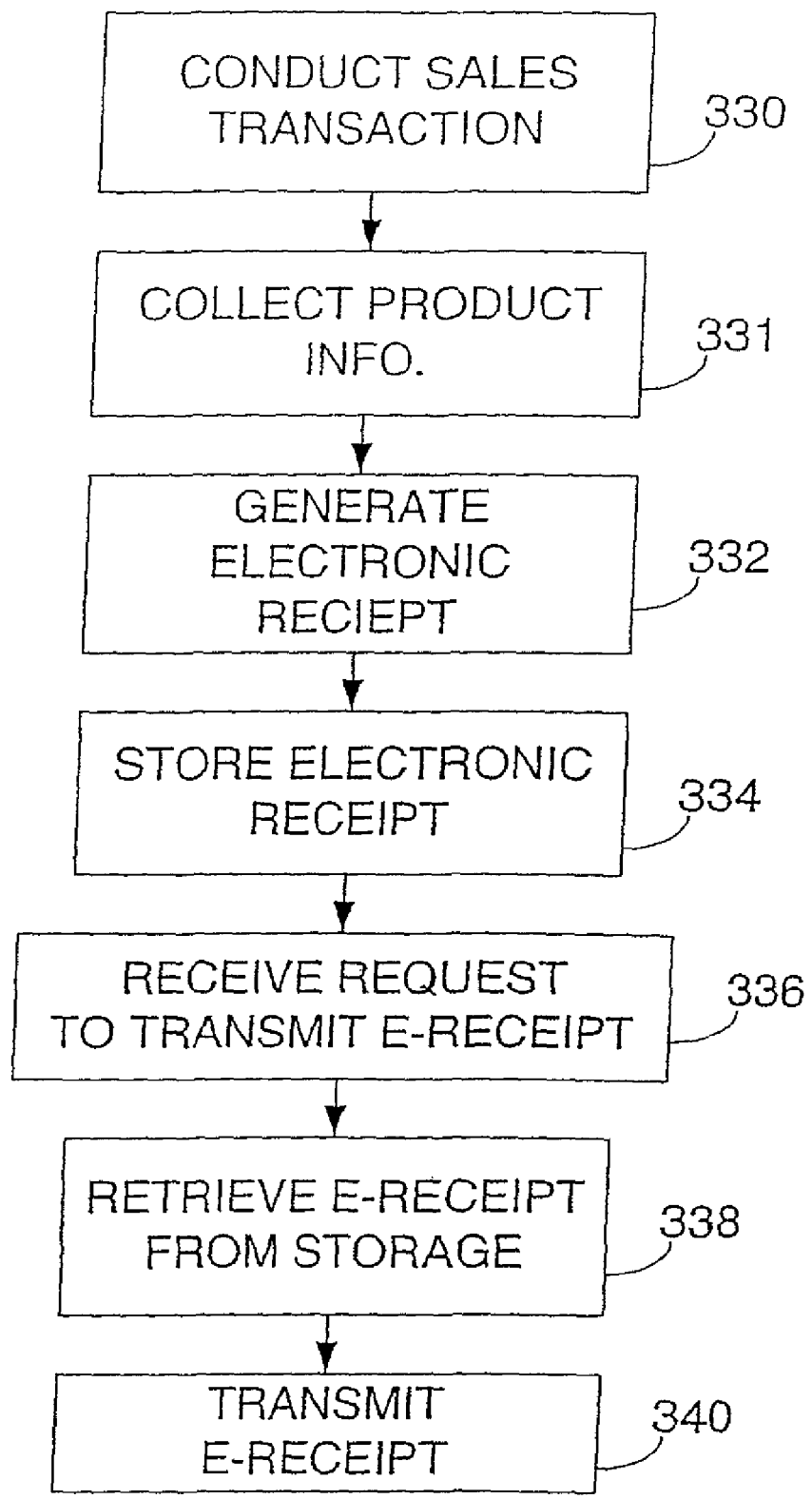
FIG. 18 is a flow diagram illustrating a method for providing product information to a buyer.

The methods described above perhaps can be more readily understood with reference to the flow diagram of FIG. 18. At step 330 a sales transaction is conducted. For example, a product or service can be purchased by a buyer from a seller. Product information is electronically collected from product 290 (FIG. 17) at step 331. Electronic receipt 288 (FIG. 17) is generated at step 332.

In one embodiment of the invention, electronic receipt 288 can be stored at step 334 in a database recorded in storage device 310 (FIG. 17) by receipt handler 314 (FIG. 17). A request for transmission of stored electronic receipt 288 can be received at step 336 and in response to such a request electronic receipt 288 can be retrieved from storage device 310 at step 338 and transmitted at step 340 by receipt handler 314.

In other embodiments of the invention, electronic receipt 288 can be transmitted at step 340 subsequent to its generation at step 332 without steps 334, 336, and 338.

In yet other embodiments of the invention, electronic receipt 288 can be stored at step 334, and automatically retrieved at step 338, and transmitted at step 340 without a request received at step 336. For example, automatic retrieval and transmission can occur on a schedule chosen by a seller of product 290 or arranged by both a seller and buyer of product 290.

In any embodiment, electronic receipt 288 can be transmitted to computing device 324 (FIG. 17). Computing device 324 can be operated by a buyer involved in a sales transaction of step 330, or a customer service representative or employee of a seller acting on a buyers behalf, or any person or persons who alone or collectively seek access to electronic receipt 288. One or more devices can be used to provide a request received at step 336 and receive electronic receipt 288 transmitted at step 340. For example, a buyer of product 290 can use a PC to provide a request within an e-mail message specifying transmission of electronic receipt 288 to any desired email or voicemail account.

Figure 19:
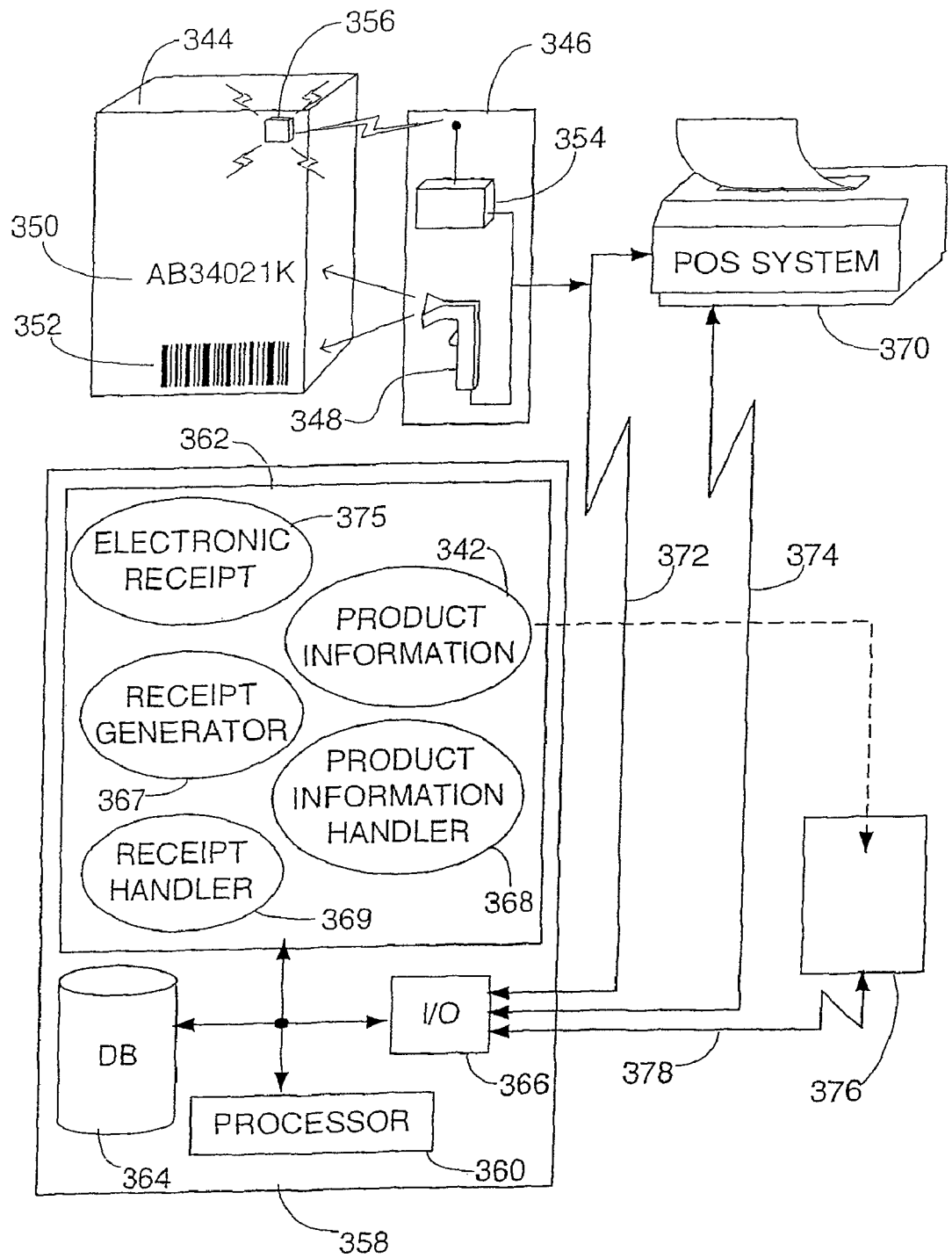
FIG. 19 illustrates a system with which product information is provided to third party.

A system for providing product information 342 collected directly from a product 344 to a third party for product registration is illustrated in FIG. 19. An electronic collector 346 electronically collects product information directly from product 344. Product information 342 can comprise a model identification and/or a unique serial number of product 344, a UPC code, any information about product 344, any information regarding the manufacture or distribution of product 344, and can further comprise a sales price of product 344, a date of sale, and/or any information regarding a transaction of product 344.

Electronic collector 346 can comprise an optical scanner 348 which emits light and collects a reflected light signal for the electronic optical character recognition (OCR) of a text and/or numeric string of characters 350 on or optically accessible within product 344. Alternately, product 344 can be provided with bar code 352 which can be scanned by optical scanner 348. Optical scanner 348 and characters 350 or bar code 352 can be selected from OCR technologies and standards that are commercially available and known to include hand-held and counter-mounted optical scanners.

In an alternative embodiment, electronic collector 346 comprises a radio-frequency (RF) device 354 that receives the transmission of an RF tag 356 on or within product 344. RF tag 356 can be of a passive type such as a transponder that is activated by a transmission signal or RF device 354 or RF tag 356 can be of an active type such as a transponder powered by a battery. RF device 354 and RF tag 356 can be selected from known and commercially available technology.

Product 344 can comprise an item exchanged from a seller to a buyer. Product 344 can further comprise packaging enclosing, attached to, enclosed within, or associated with an item exchanged. Thus, the term "product," as used in this patent specification, means the product itself or its packaging or both. Furthermore, product 344 can comprise an item indicative of a product or service exchanged or to be exchanged. For example, product 344 can comprise a purchase value certificate or voucher for purchase or rental of items already selected or to be selected later by a holder of product 344.

A computer system 358 comprises a processor 360, a main memory 362, a storage device 364, and an input and output interface 366. Software elements comprising an electronic-receipt generator 367, product information handler 368, and receipt handler 369, are illustrated for purposes of clarity as executable in main memory 362 but, as persons skilled in the art will understand, may not in actuality reside in their entireties in main memory 362. Computer system 358 is illustrated as a computer system housed within a single unit. It should be understood however, that the various above-detailed elements of computer system 358 can be distributed among any number of computing units and can include multiple layers of servers, processors, and storage devices as is common in the art for such electronic communication and e-commerce computer systems. Although not illustrated for purposes of clarity, computer system 358 can include a video monitor, keyboard, mouse, and other user input/output devices of the types commonly included in such systems for use by system administrators and similar personnel. Although illustrated as separate, computer system 358 and a POS system 370, which conducts a transaction of product 344, can be included in a single system existing as a distributed computer network or existing as a single unit located at a point of sale.

Product information 342 collected directly from product 344 by electronic collector 346 can reach computer system 358 directly from electronic collector 346 via a connection 372. Alternatively, product information 342 can reach computer system 358 through POS system 370 via a connection 374. Product information handler 368 can store product information 342 within storage device 364.

Electronic-receipt generator 367 generates electronic receipt 375 in the same manner as described above with regard to other embodiments of the invention. Electronic receipt 375 comprises all of product information 342, or a subset thereof, collected directly from product 344 by electronic collector 346. Electronic receipt 375 can comprise additional information, such as the date of the transaction of product 344, a description of product 344, the identity of a buyer, and the identity of a seller. Electronic receipt 375 can be stored in a database recorded in storage device 364. Storage and any retrieval of electronic receipt 375 are facilitated by receipt handler 369.

Access to product information 342 is available through a computing device 376. Computing device 376 communicates with input and output interface 366 via a connection 378. Connections 372, 374, and 378 can each separately or together comprise a computer network, such as, for example the Internet or any sub-network of the Internet, or a local area network (e.g., within a retail store).

Computing device 376 can be a personal computer (PC), a personal digital assistant (PDA), a digital cellular phone, or any other device with data transmission and reception capabilities and data display, presentation, or relay means, for example a display screen (not shown), available to a user. Computing device 376 can be a single device as illustrated in FIG. 19, or can be two or more separate devices.

In one embodiment of the invention, computing device 376 provides to computer system 358 a request for access to product information 342. In other embodiments of the invention, product information 342 is automatically transmitted to computing device 376 by computer system 358. Automatic transmission can occur upon collection of product information 342 or can occur later with storage device 364 storing product information 342 between the times of its collection and transmission. Product information handler 368 conducts the transmission and any storage and retrieval of product information 342.

Figure 20:
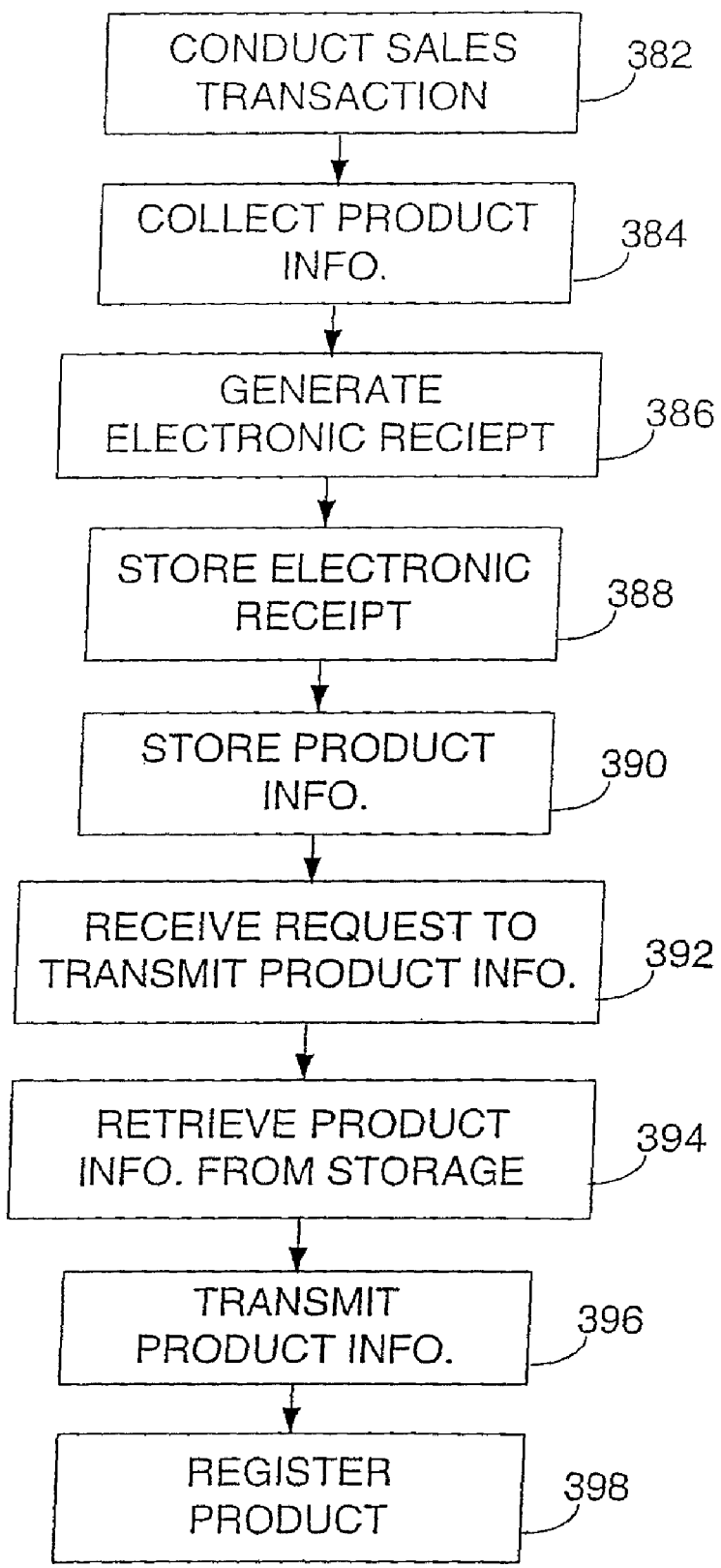
FIG. 20 is a flow diagram illustrating a method for providing product information to a third party.

The methods described above perhaps can be more readily understood with reference to the flow diagram of FIG. 20. At step 382 a sales transaction is conducted. For example, a product or service can be purchased by a buyer from a seller. Product information 342 (FIG. 19) is electronically collected directly from product 344 (FIG. 19) by electronic collector 346 (FIG. 19) at step 384.

At step 386, electronic receipt 375 is generated by electronic-receipt generator 367. At step 388, electronic receipt 375 is stored in a database recorded in storage device 364 by receipt handler 369 and may be later accessed in any manner described above with regard to other embodiments of the invention.

In one embodiment of the invention, product information 342 can be stored at step 390 in a database recorded in storage device 364 (FIG. 19) by product information handler 368 (FIG. 19). A request for transmission of stored product information 342 can be received at step 392 and in response to such a request product information 342 can be retrieved from storage device 364 at step 394 and transmitted at step 396 by product information handler 368.

In other embodiments of the invention, product information 342 can be transmitted at step 396 subsequent to its collection at step 384 without steps 390, 392 and 394.

In yet other embodiments of the invention, product information 342 can be stored at step 388, and automatically retrieved at step 394, and transmitted at step 396 without a request-receiving step 392. For example, automatic retrieval and transmission can occur on a schedule chosen by a seller of product 344 or arranged by both a seller of product 344 and a recipient of product information 342 transmitted at step 396.

In any embodiment, product information can be transmitted to computing device 376 (FIG. 19). One or more devices can be used to provide the request of step 392 and/or receive electronic receipt 375 transmitted at step 396.

Computing device 376 can be operated by a third party other than a buyer or seller involved in a sales transaction of step 382. A third party can receive product information 342 to provide a service to a buyer, a seller, or a manufacturer of product 344. For example, a third party can register the product at step 398 to provide a service to the buyer or seller. A third party can, for example, provide or record a product warranty registration, and/or notify a seller, manufacturer, or distributor of product 344 of a sale for the purpose of product restocking.

As illustrated by the above-described embodiments, the present invention provides electronic receipts having novel functionality, such upselling or inducing secondary sales of related products and providing access to warranties, product returns, user manuals, recall notices and other information potentially of interest to consumers. It further provides a mechanism for organizing and otherwise handling such receipts.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for facilitating a return of a product purchased by a buyer from a seller, comprising:
   a. a database for storing a plurality of sales transactions between a plurality of buyers and a plurality of sellers, wherein a selected sales transaction of the plurality of sales transactions is associated with the product, a selected buyer of the plurality of buyers and a selected seller of the plurality of sellers;
   b. a processor for:
      i. receiving from a device operated by the selected buyer a signal indicating that the selected buyer wishes to return the product purchased in the selected sales transaction to the selected seller;
      ii. identifying in the database the selected seller associated with the product and the selected sales transaction;
      iii. generating a label associated with the product, the selected sales transaction and the selected seller, the label including information necessary for a shipper to route a package containing the product back to the selected seller;
      iv. transmitting the label to the device operated by the selected buyer.

2. The system of claim 1, wherein the selected buyer prints the label for affixing to the package.

3. The system of claim 1, wherein the return label includes a return authorization number.

4. The system of claim 1, wherein the selected seller is a retailer.

5. The system of claim 1, wherein the selected buyer is a consumer.

6. The system of claim 1, further comprising a printer for printing the label.

7. The system of claim 6, wherein the printer is associated with the device operated by the selected buyer.

8. A method for facilitating a return of a product purchased by a buyer from a seller, comprising the steps of:
   a. storing a plurality of sales transactions between a plurality of buyers and a plurality of sellers in a database, wherein a selected sales transaction of the plurality of sales transactions is associated with the product, a selected buyer of the plurality of buyers and a selected seller of the plurality of sellers;
   b. receiving from a device operated by the selected buyer a signal indicating that the selected buyer wishes to return the product purchased in the selected sales transaction to the selected seller;
   c. identifying in the database the selected seller associated with the product and the selected sales transaction;
   d. generating a label associated with the product, the selected sales transaction and the selected seller, the label including information necessary for a shipper to route a package containing the product back to the selected seller;
   e. transmitting the label to the device operated by the selected buyer.

9. The method of claim 8, wherein the selected buyer prints the label for affixing to the package.

10. The method of claim 8, wherein the return label includes a return authorization number.

11. The method of claim 8, wherein the selected seller is a retailer.

12. The method of claim 8, wherein the selected buyer is a consumer.

13. A computer program product having a computer readable program code embodied therein, the computer readable program code adapted to be executed to implement a method for facilitating a return of a product purchased by a buyer from a seller, the method comprising the steps of:
   a. storing a plurality of sales transactions between a plurality of buyers and a plurality of sellers in a database, wherein a selected sales transaction of the plurality of sales transactions is associated with the product, a selected buyer of the plurality of buyers and a selected seller of the plurality of sellers;

b. receiving from a device operated by the selected buyer a signal indicating that the selected buyer wishes to return the product purchased in the selected sales transaction to the selected seller;

c. identifying in the database the selected seller associated with the product and the selected sales transaction;

d. generating a label associated with the product, the selected sales transaction and the selected seller, the label including information necessary for a shipper to route a package containing the product back to the selected seller;

e. transmitting the label to the device operated by the selected buyer.

\* \* \* \* \*